(12) United States Patent
Kimura

(10) Patent No.: US 7,995,286 B2
(45) Date of Patent: Aug. 9, 2011

(54) ZOOM LENS AND IMAGE PICKUP APPARATUS INCLUDING THE SAME

(75) Inventor: Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 12/628,908

(22) Filed: Dec. 1, 2009

(65) Prior Publication Data

US 2010/0134901 A1 Jun. 3, 2010

(30) Foreign Application Priority Data

Dec. 3, 2008 (JP) ................................. 2008-308437

(51) Int. Cl.
*G02B 15/14* (2006.01)
*H04N 5/262* (2006.01)

(52) U.S. Cl. ...................... 359/687; 359/686; 348/240.3

(58) Field of Classification Search ............... 348/240.3; 359/684, 685, 686, 687
See application file for complete search history.

(56) References Cited

U.S. PATENT DOCUMENTS

| | | |
|---|---|---|
| 5,963,378 A | 10/1999 | Tochigi |
| 6,166,864 A | 12/2000 | Horiuchi |
| 7,057,818 B2 * | 6/2006 | Hamano et al. ............... 359/557 |
| 7,190,529 B2 | 3/2007 | Miyajima et al. |
| 7,206,137 B2 | 4/2007 | Nakatani |

FOREIGN PATENT DOCUMENTS

JP 2007-212537 A 8/2007

\* cited by examiner

*Primary Examiner* — David N Spector
(74) *Attorney, Agent, or Firm* — Canon U.S.A., Inc. IP Division

(57) ABSTRACT

A zoom lens includes first to fourth lens units in order from the object side to the image side. The first, third, and fourth lens units have a positive refractive power. The second lens unit has a negative refractive power. During zooming from a wide-angle end to a telephoto end, the first lens unit moves along a locus convex toward the image side, the second lens unit moves along a locus convex toward the image side from the wide-angle end to an intermediate zoom position and along a locus convex toward the object side from the intermediate zoom position to the telephoto end, and the third lens unit moves such that the distance to the second lens unit at the telephoto end is smaller than that at the wide-angle end. Focal lengths of the first lens unit and the entire lens system at the telephoto end are adequately set.

13 Claims, 30 Drawing Sheets

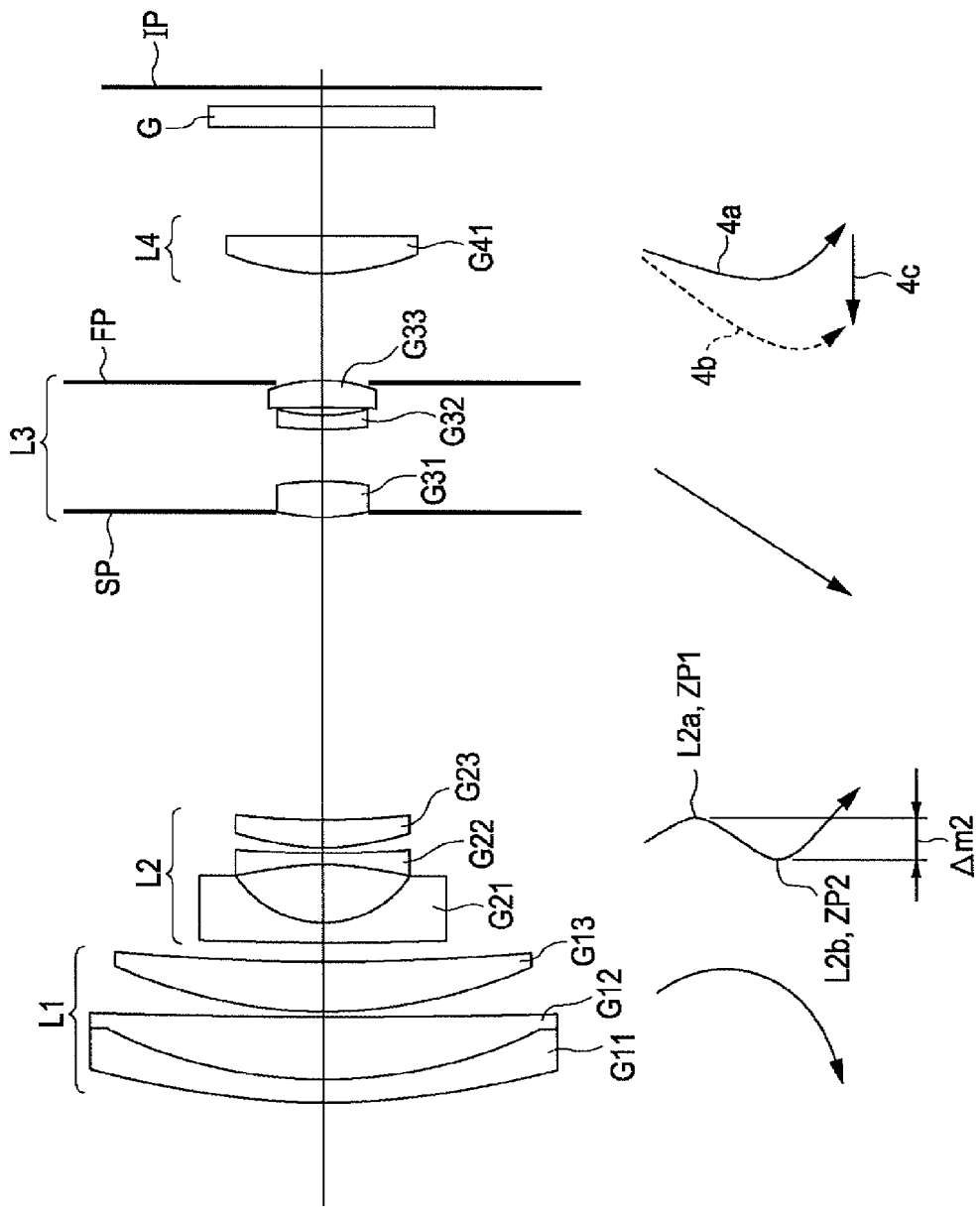

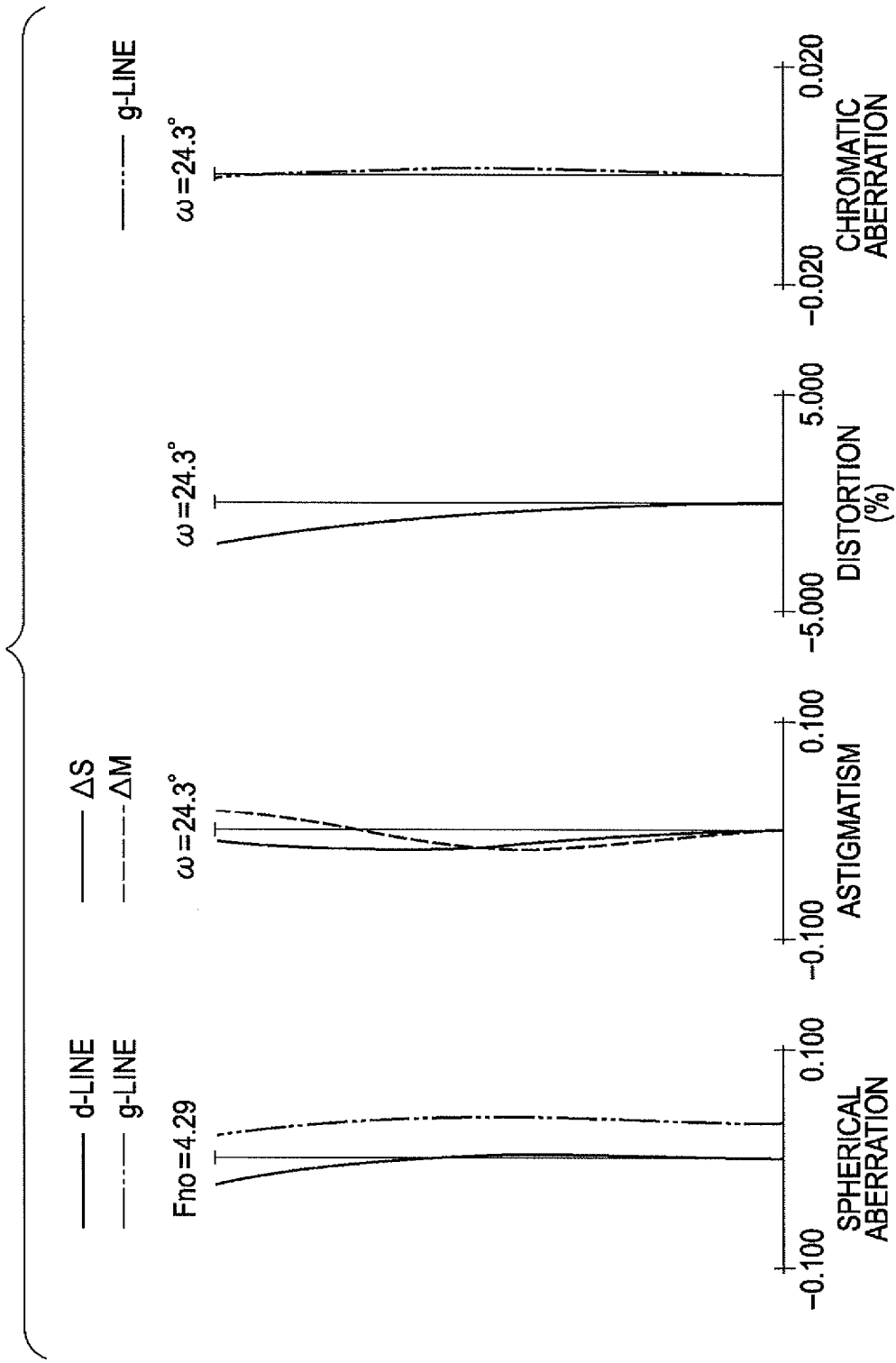

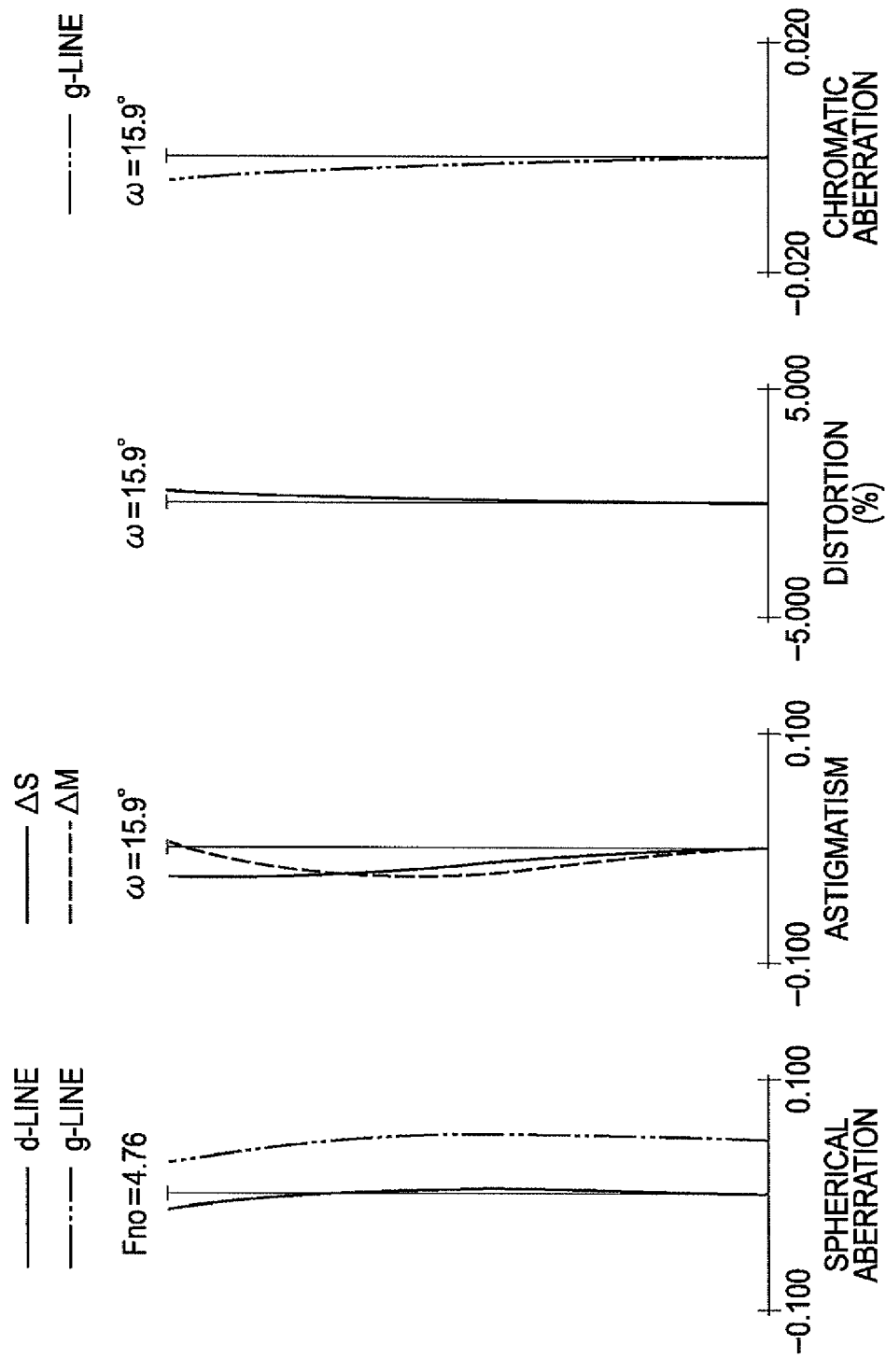

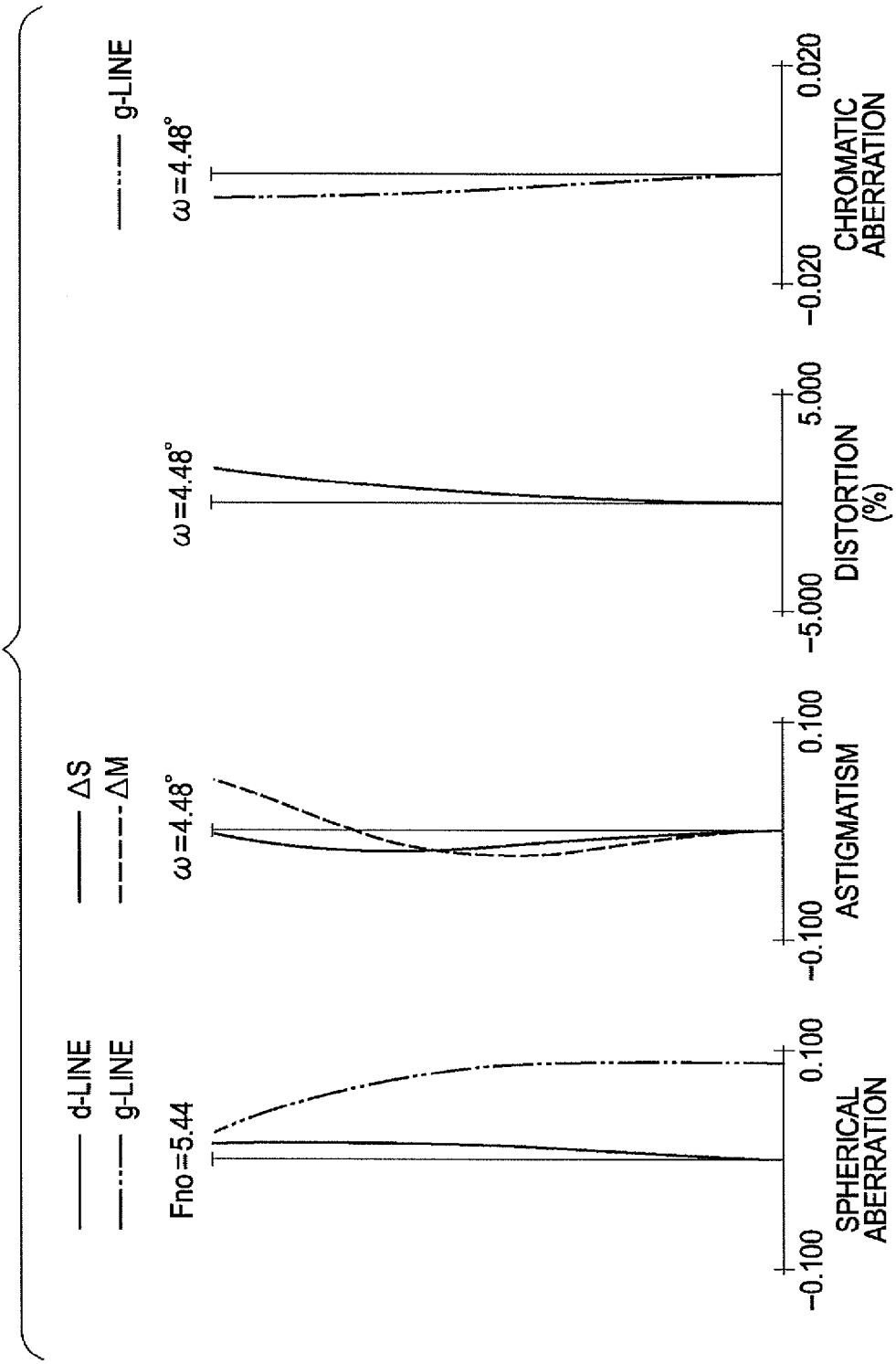

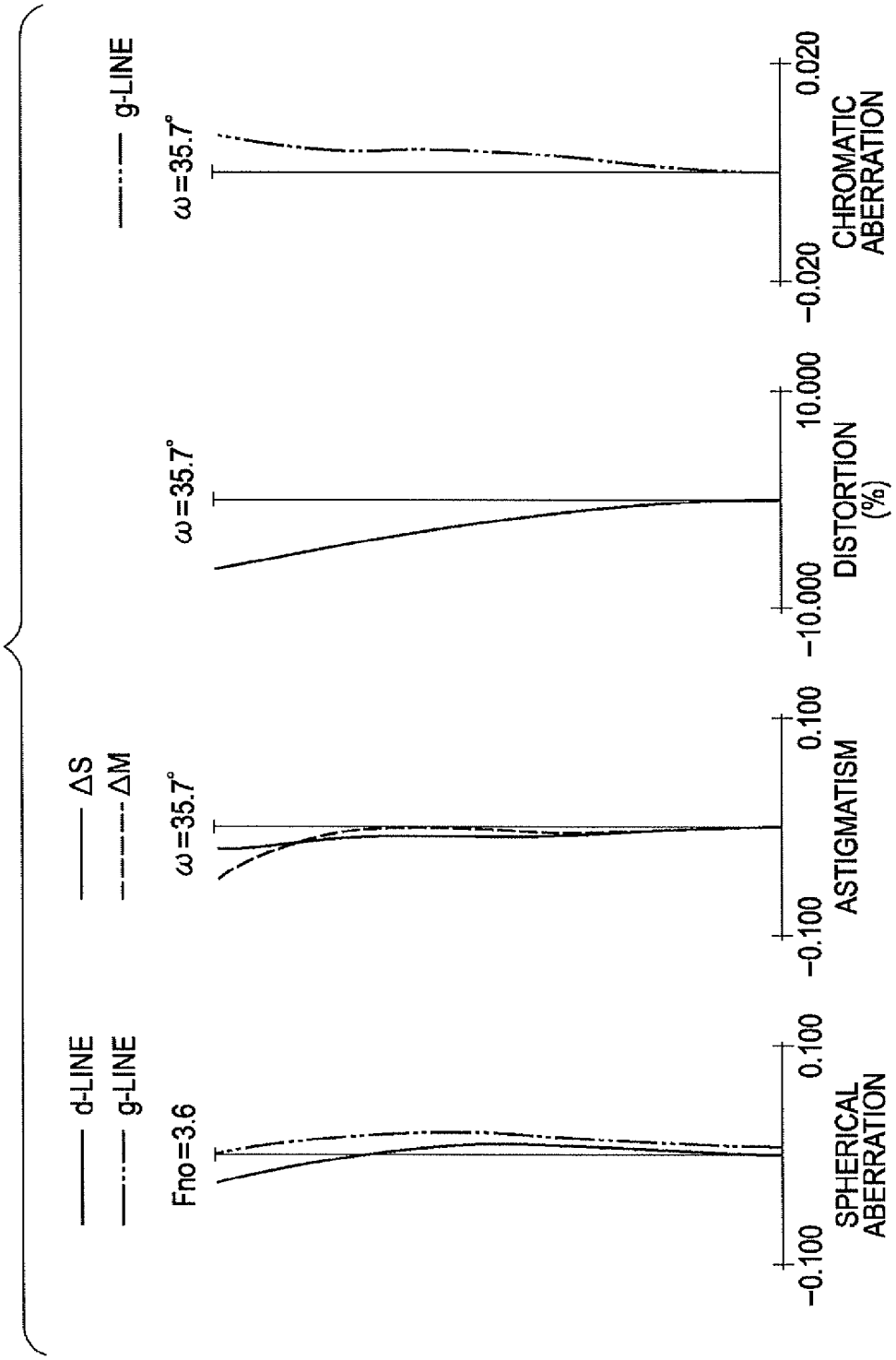

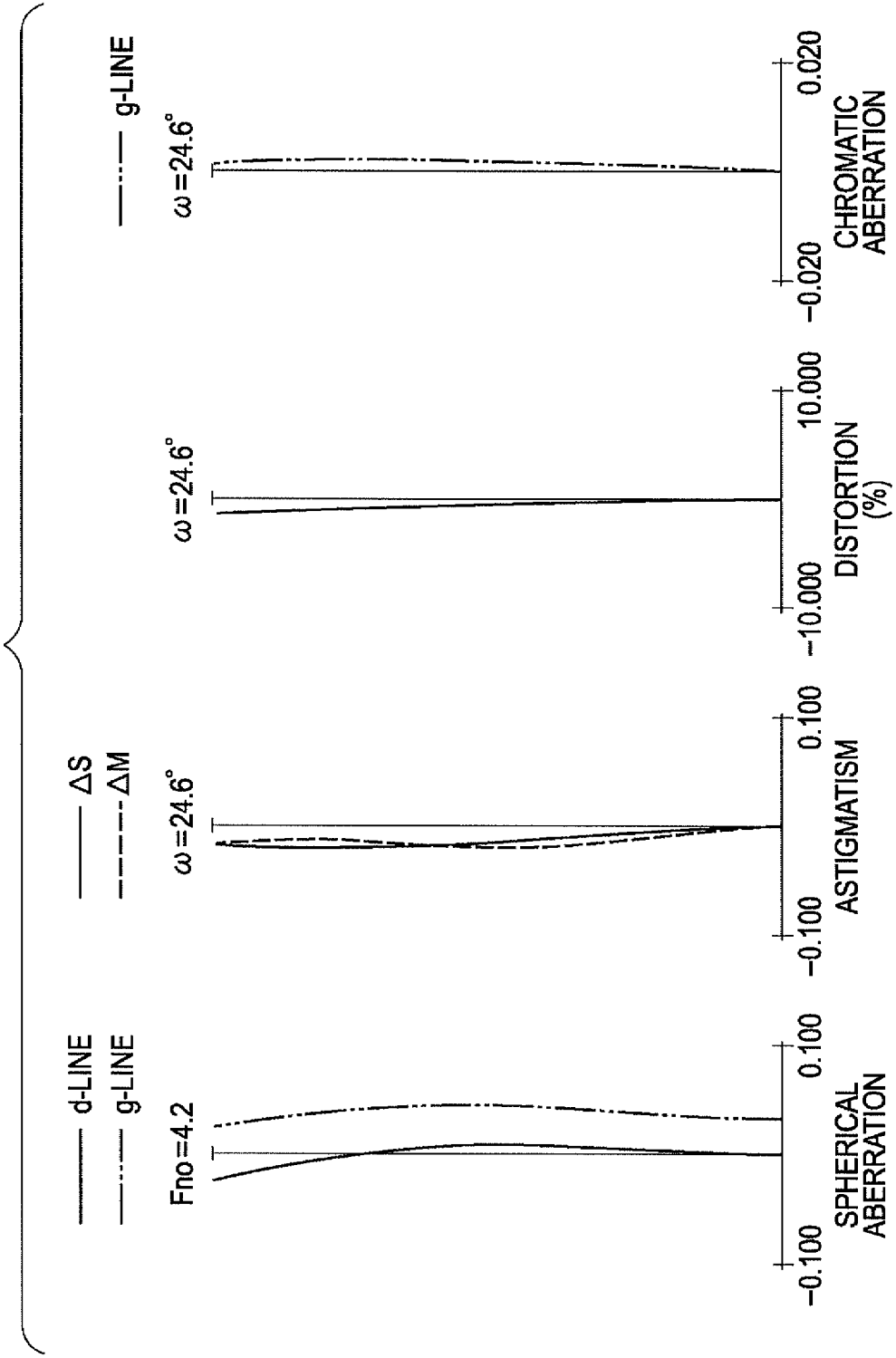

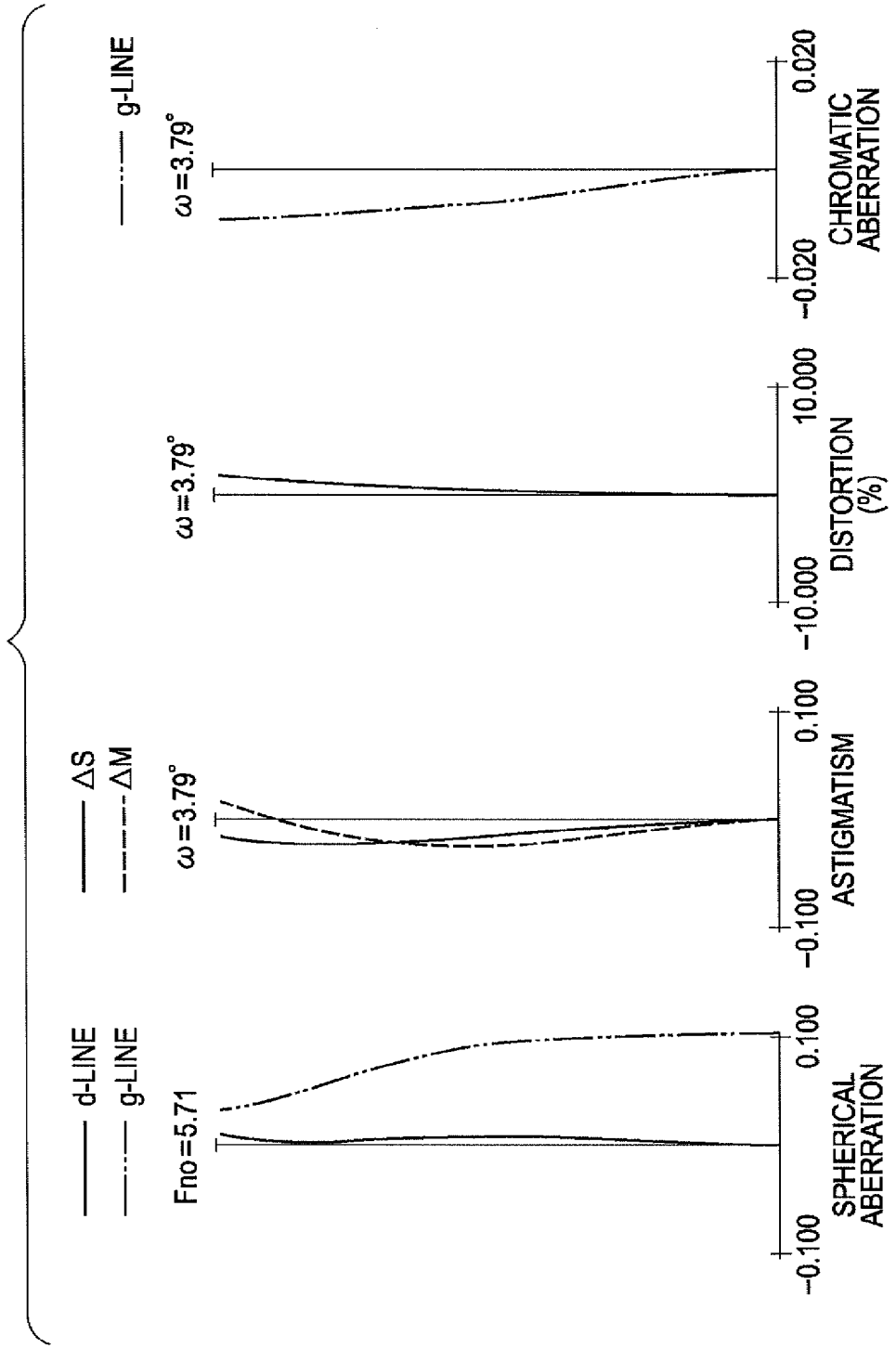

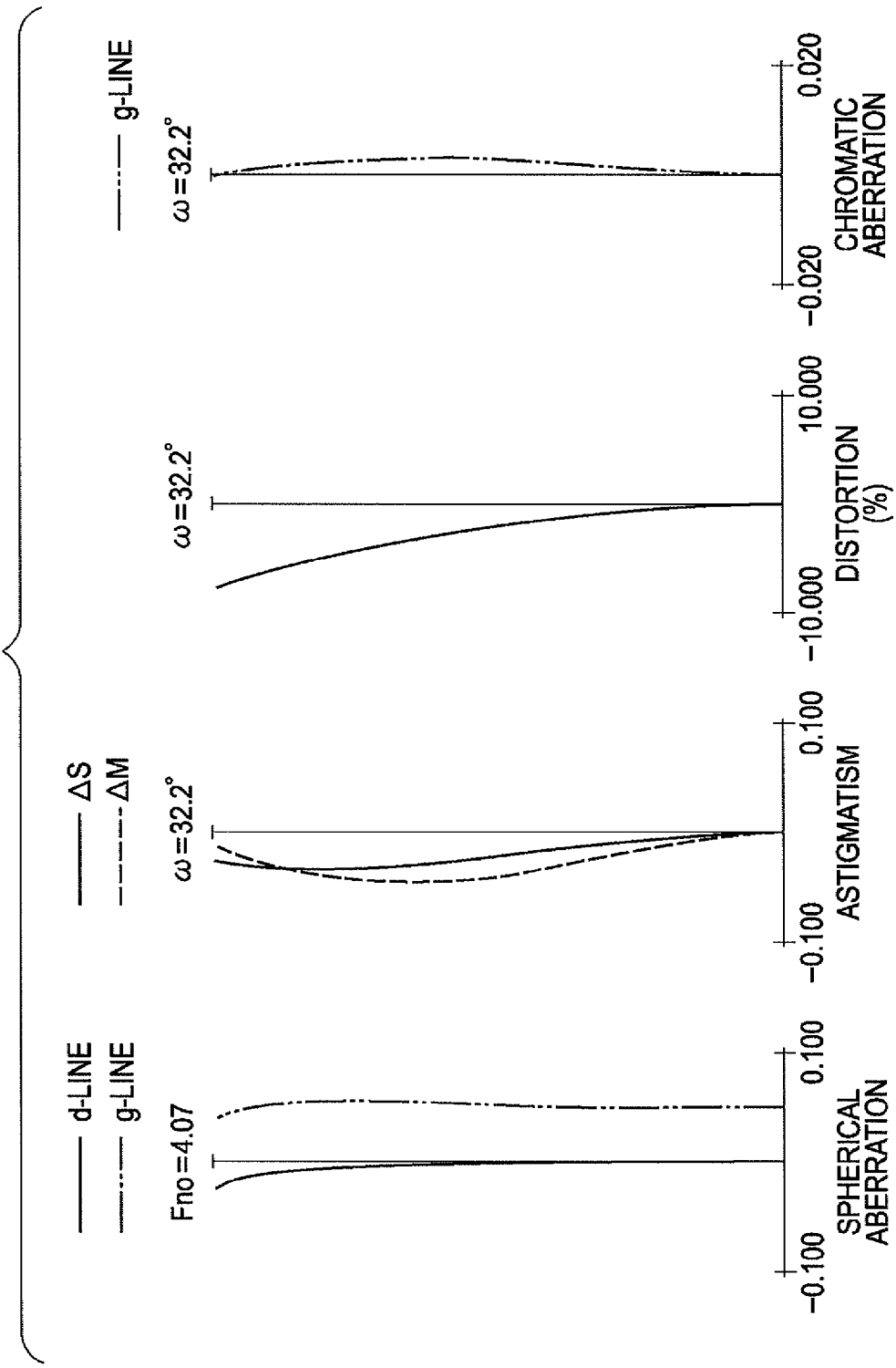

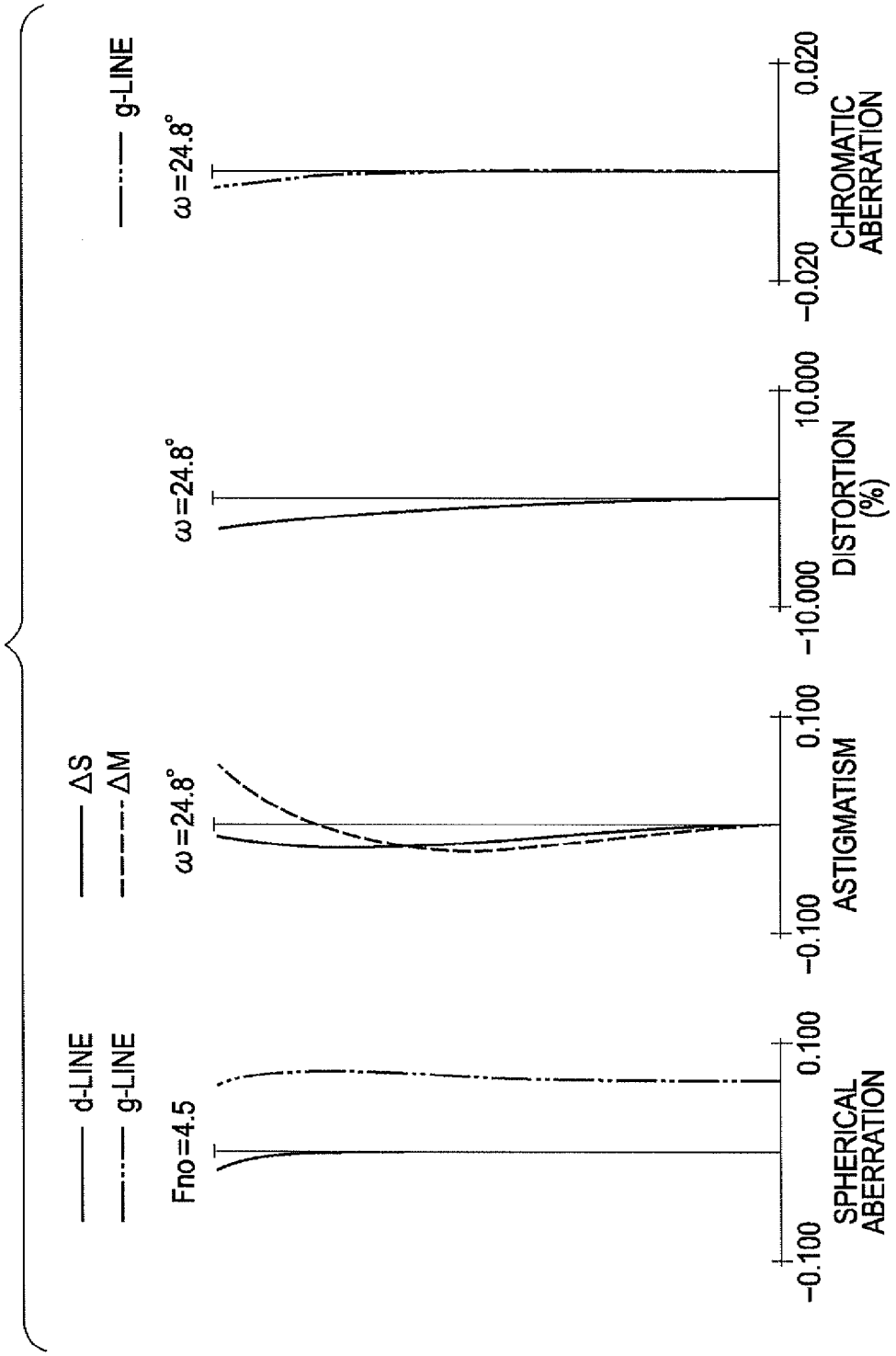

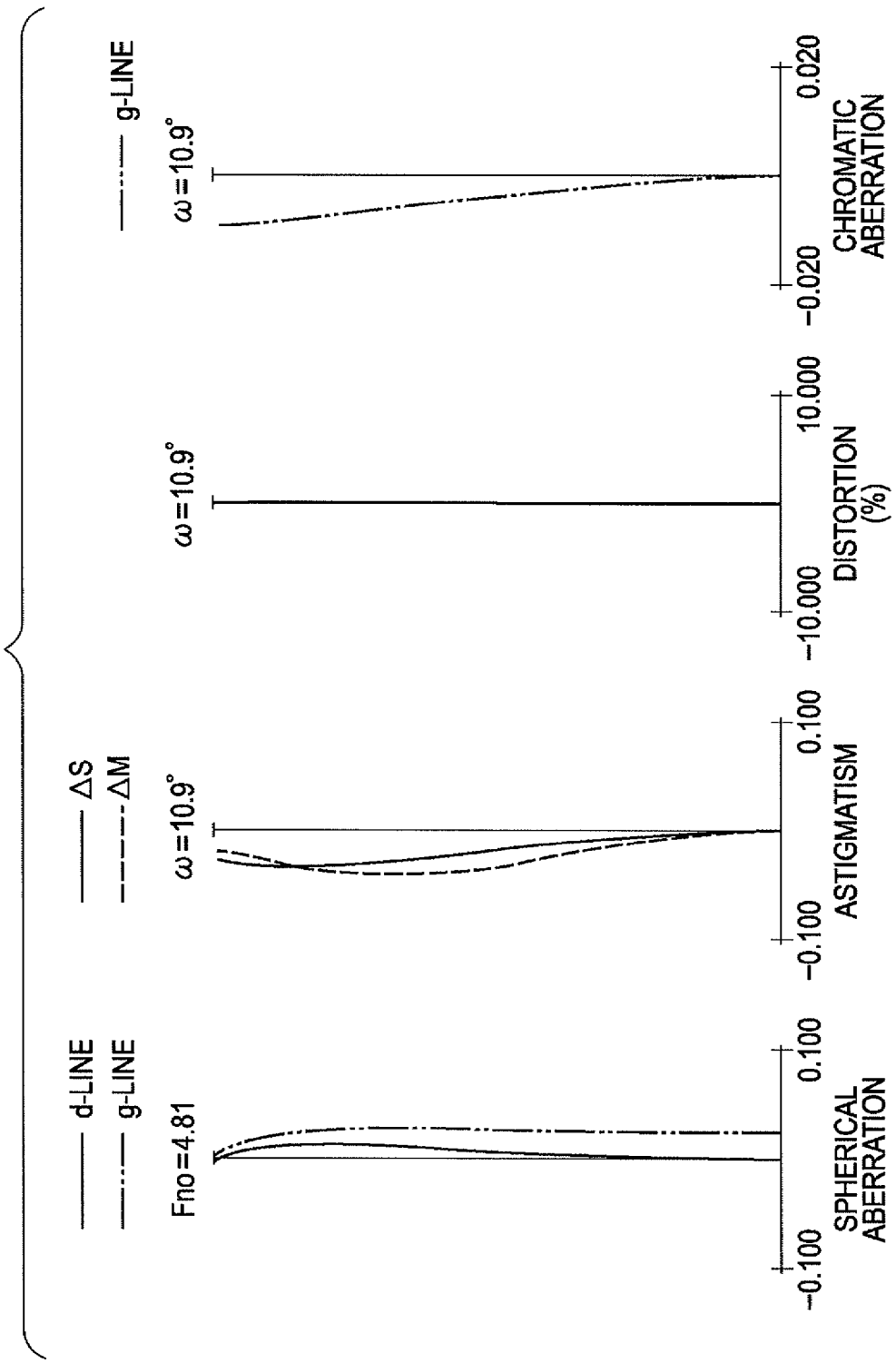

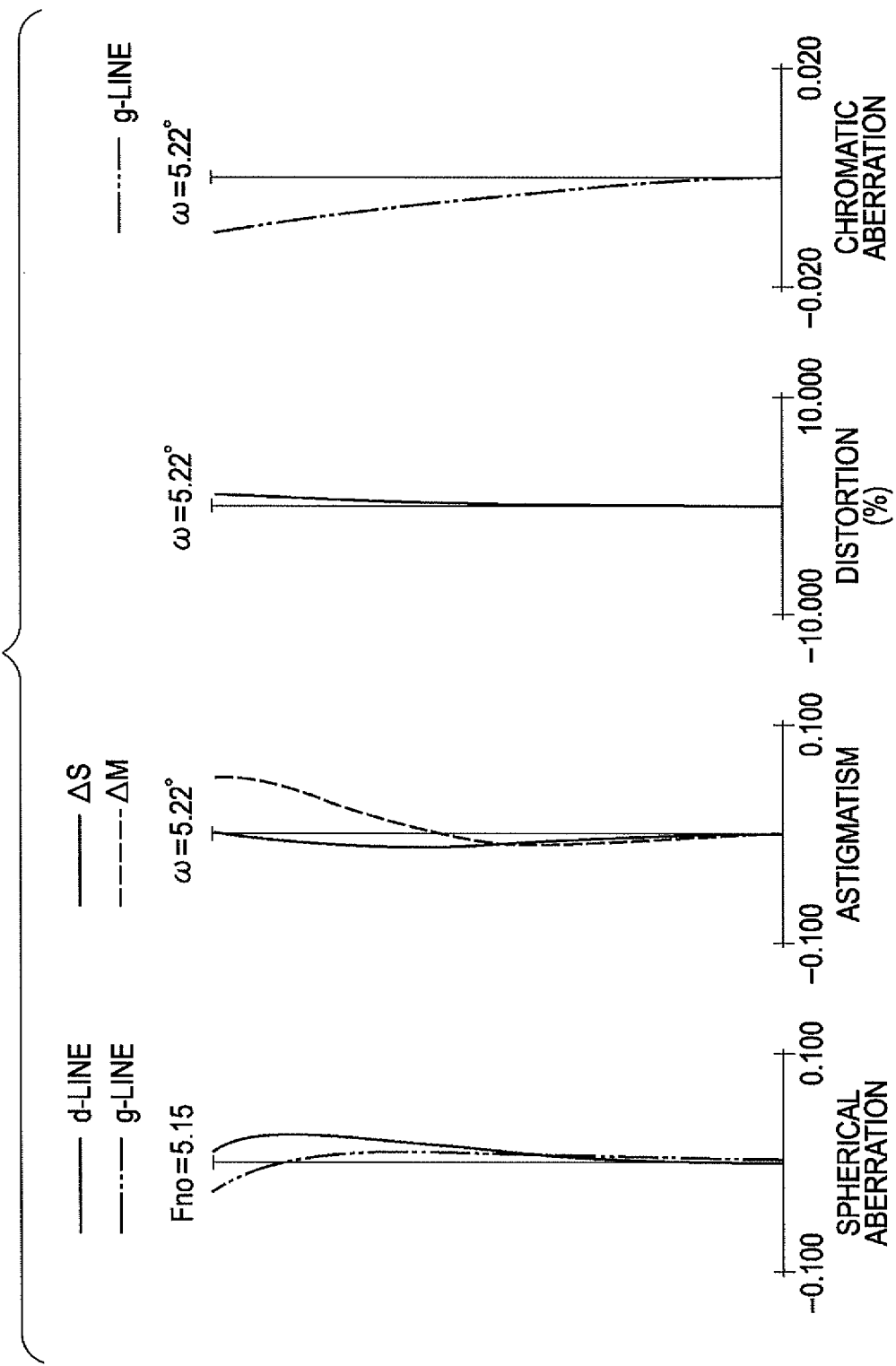

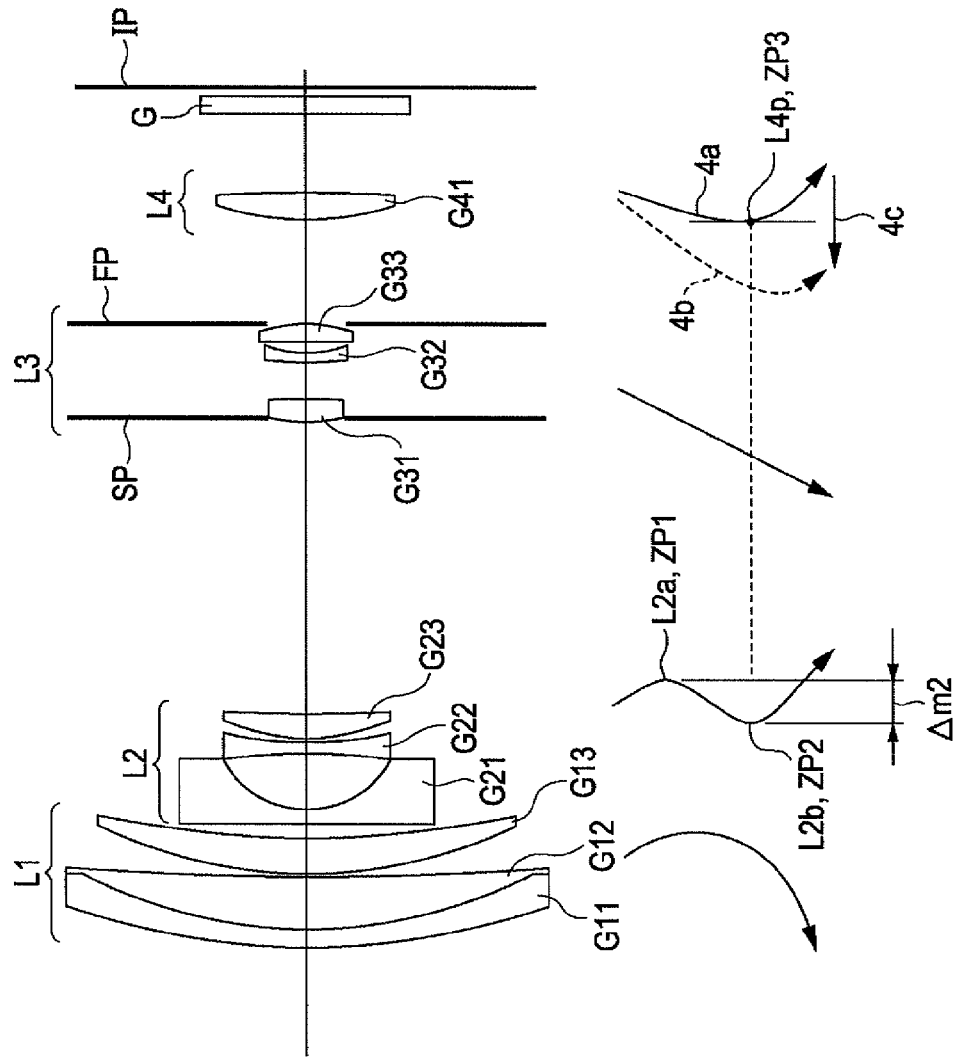

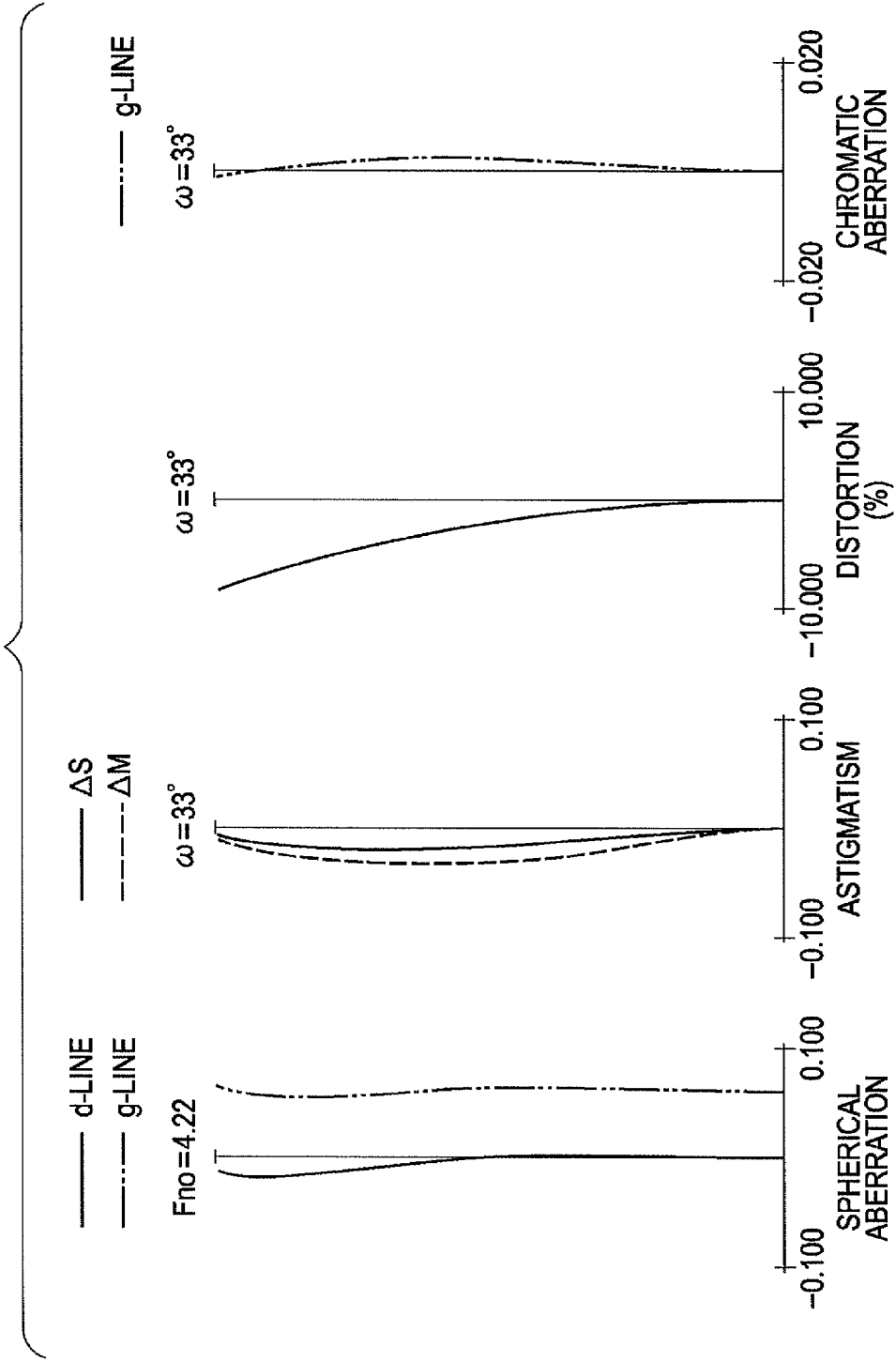

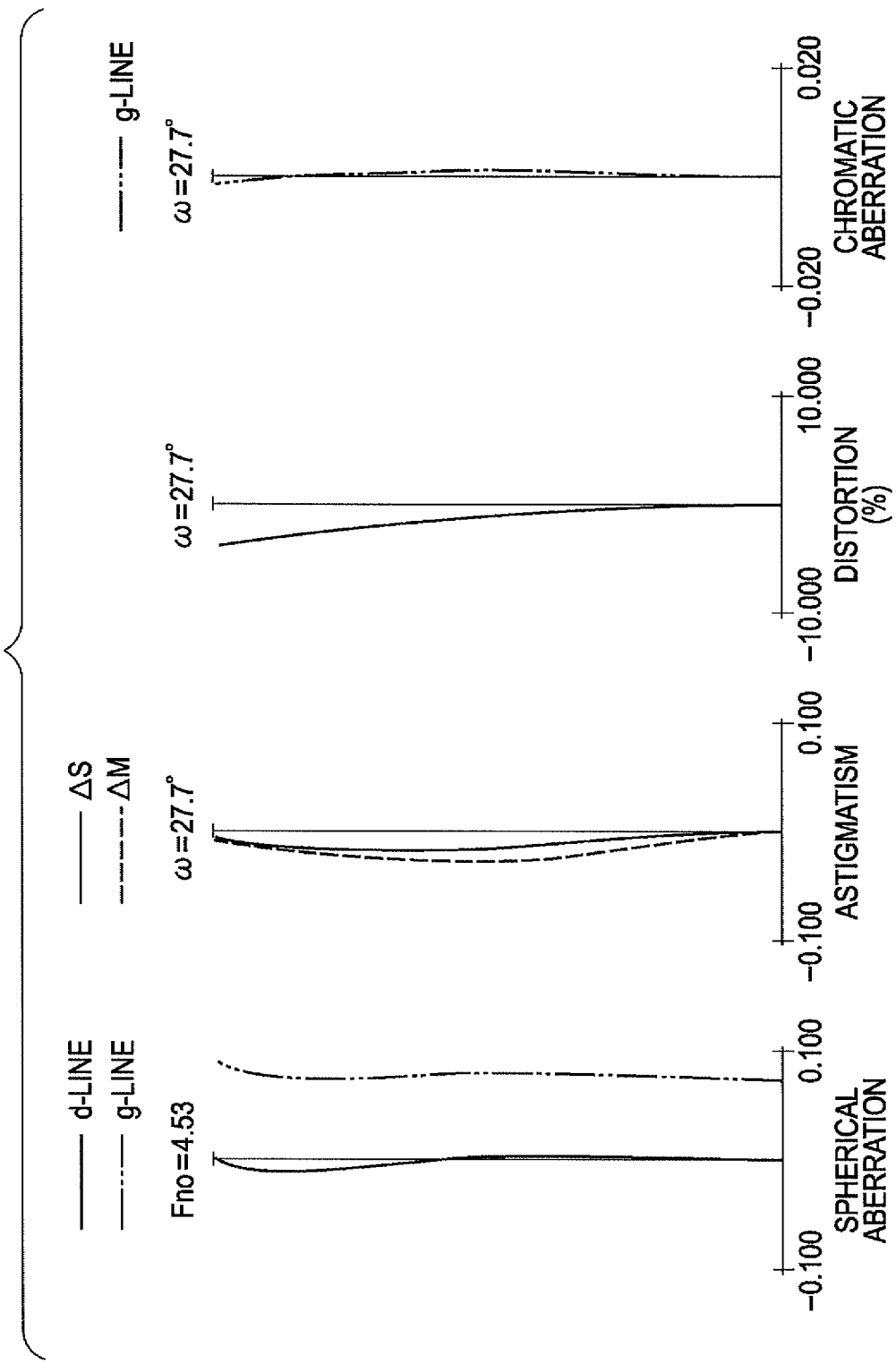

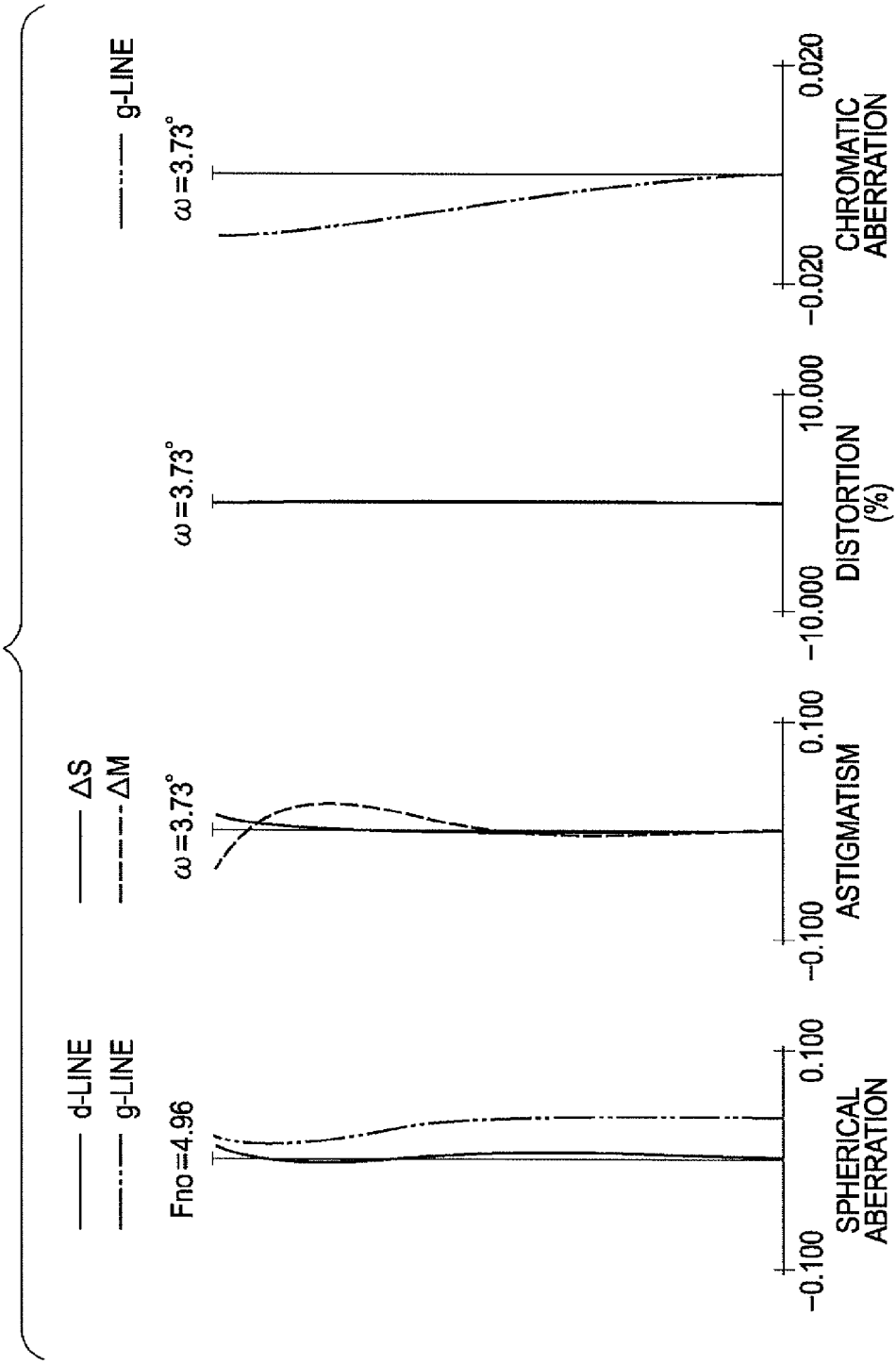

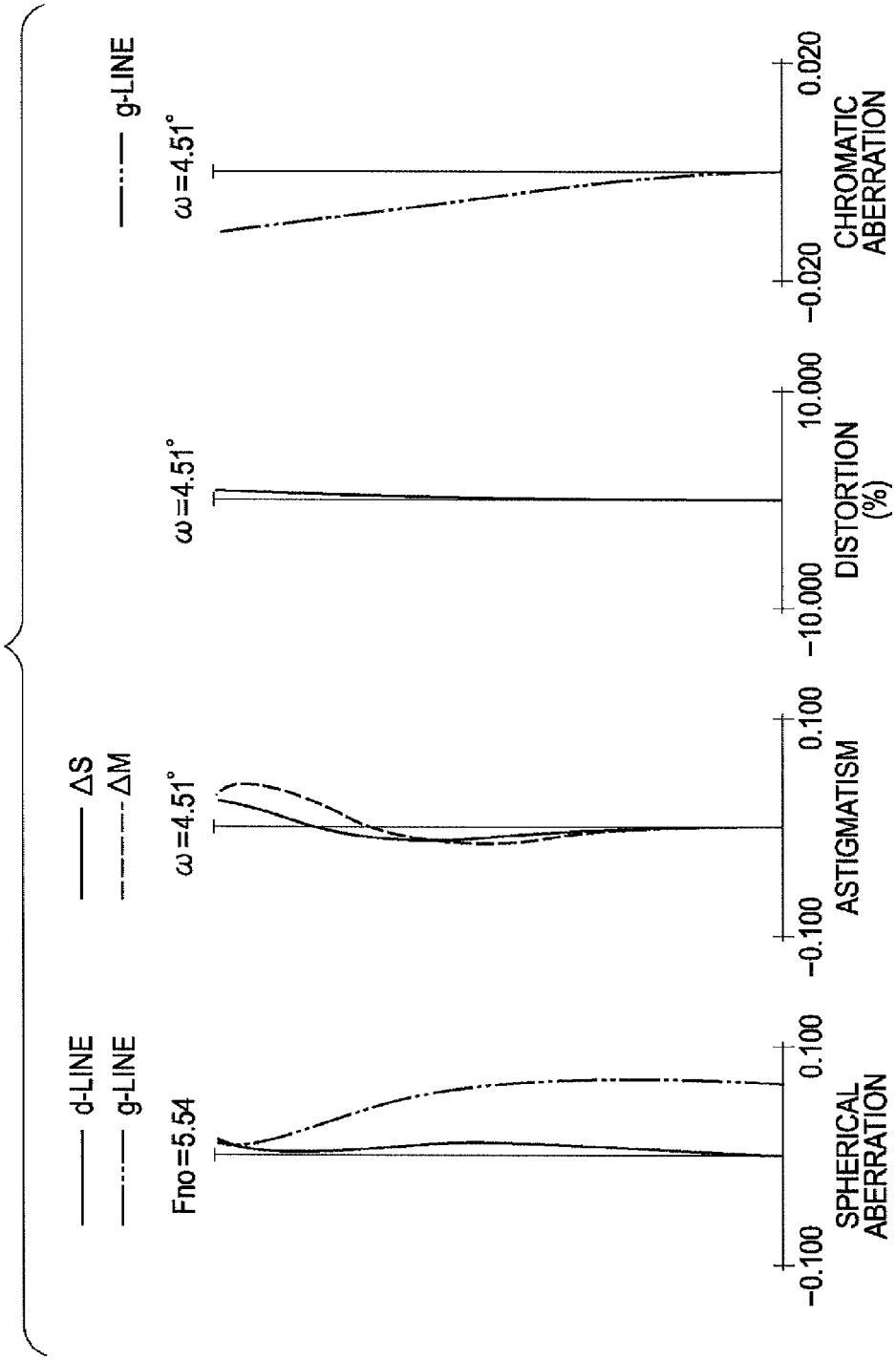

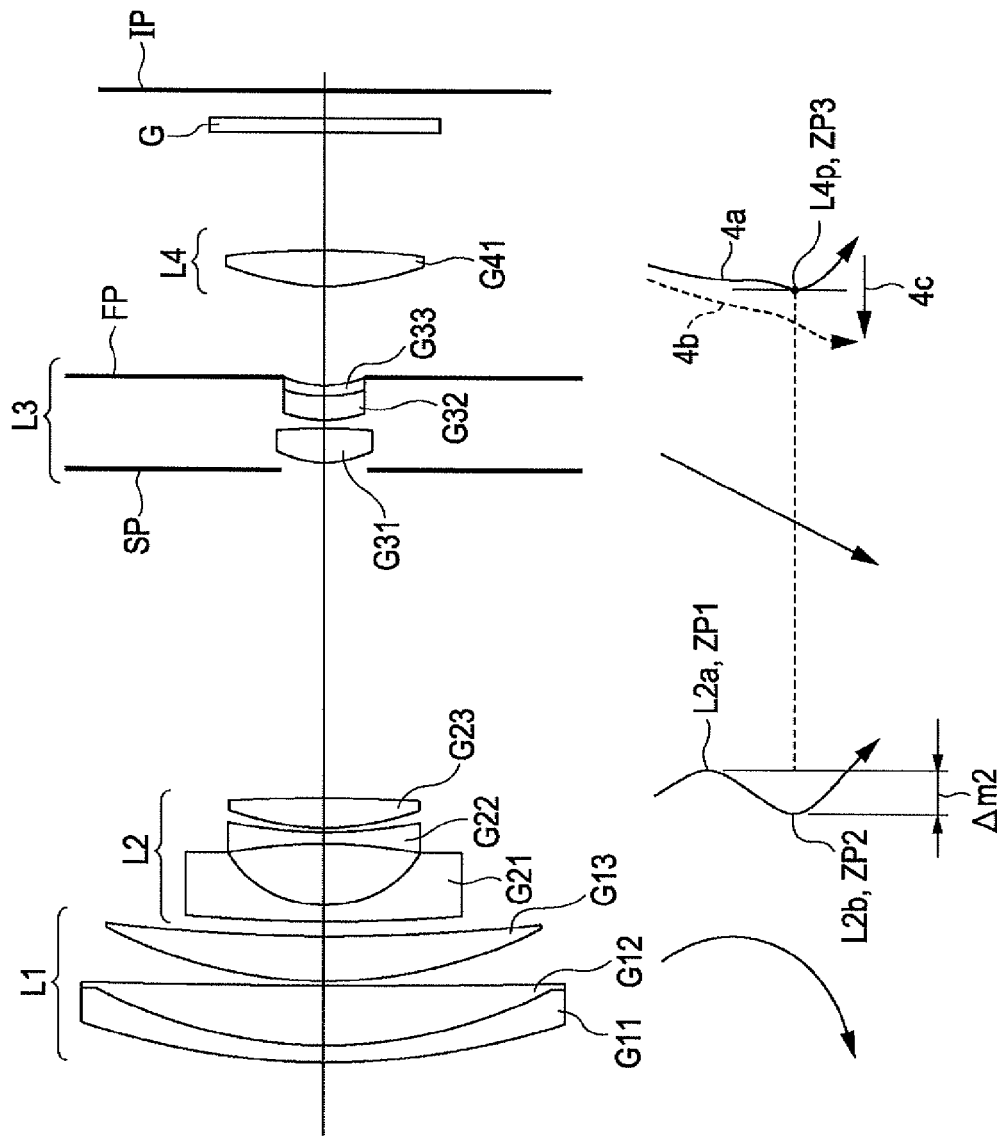

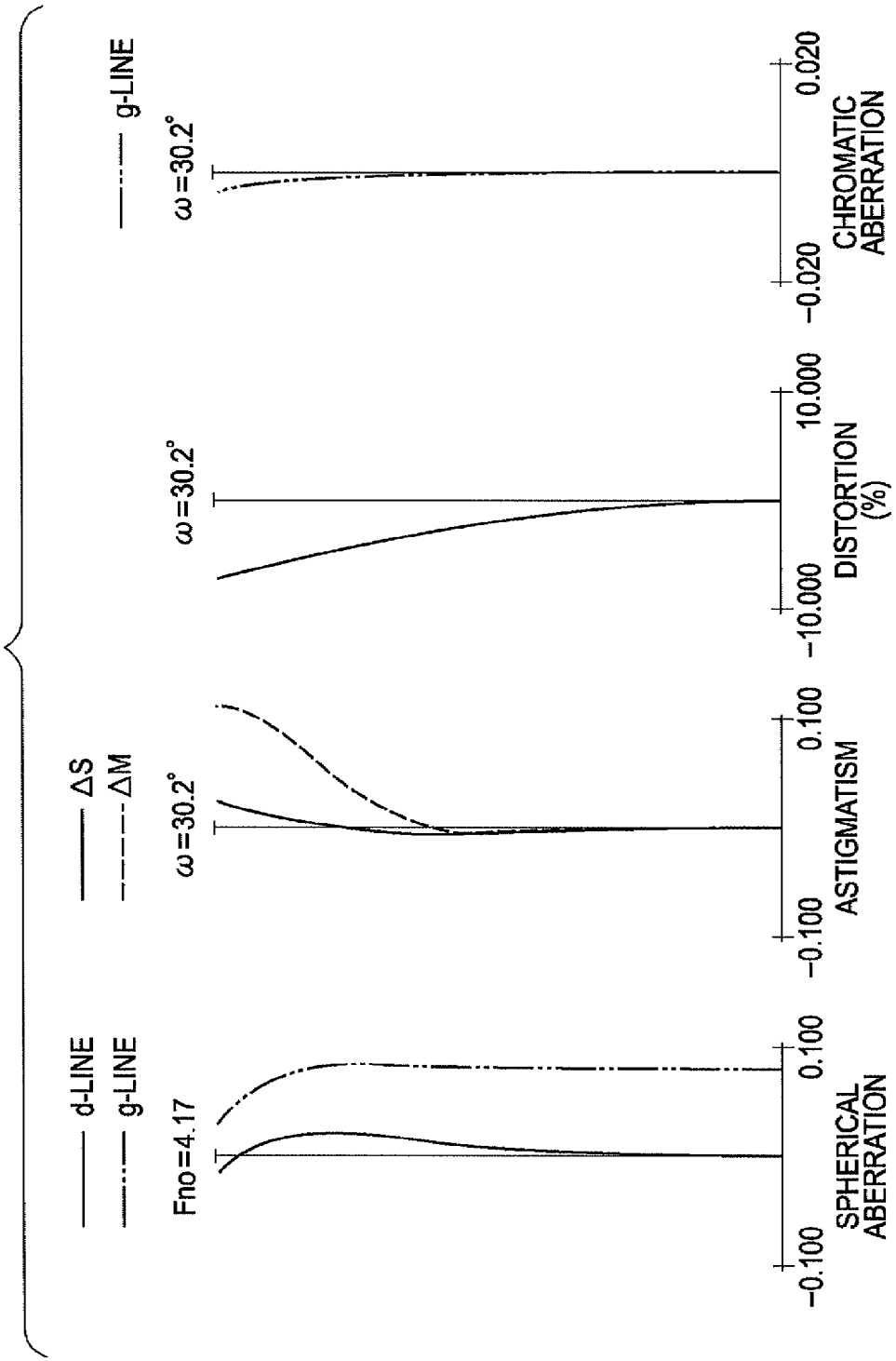

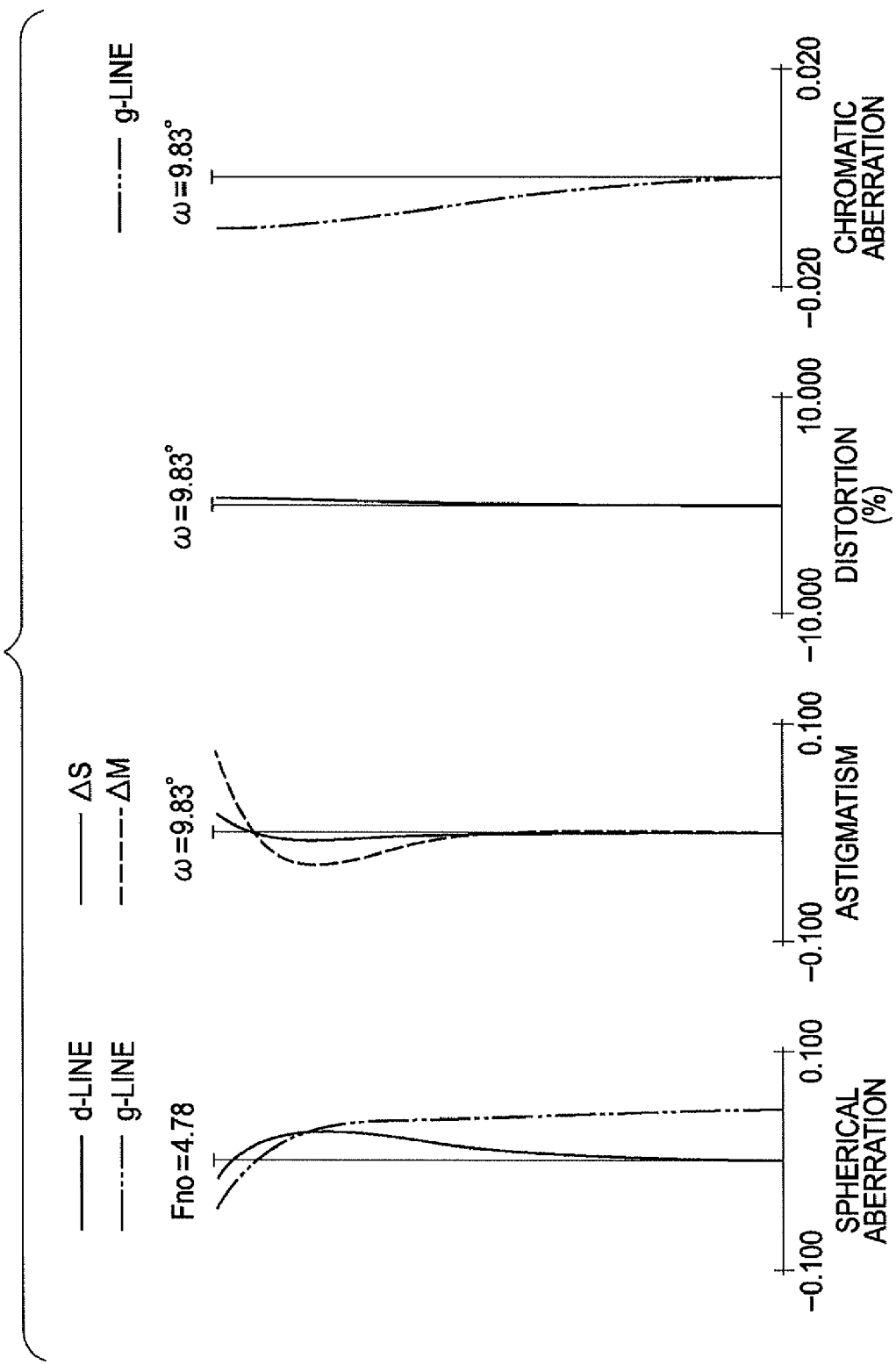

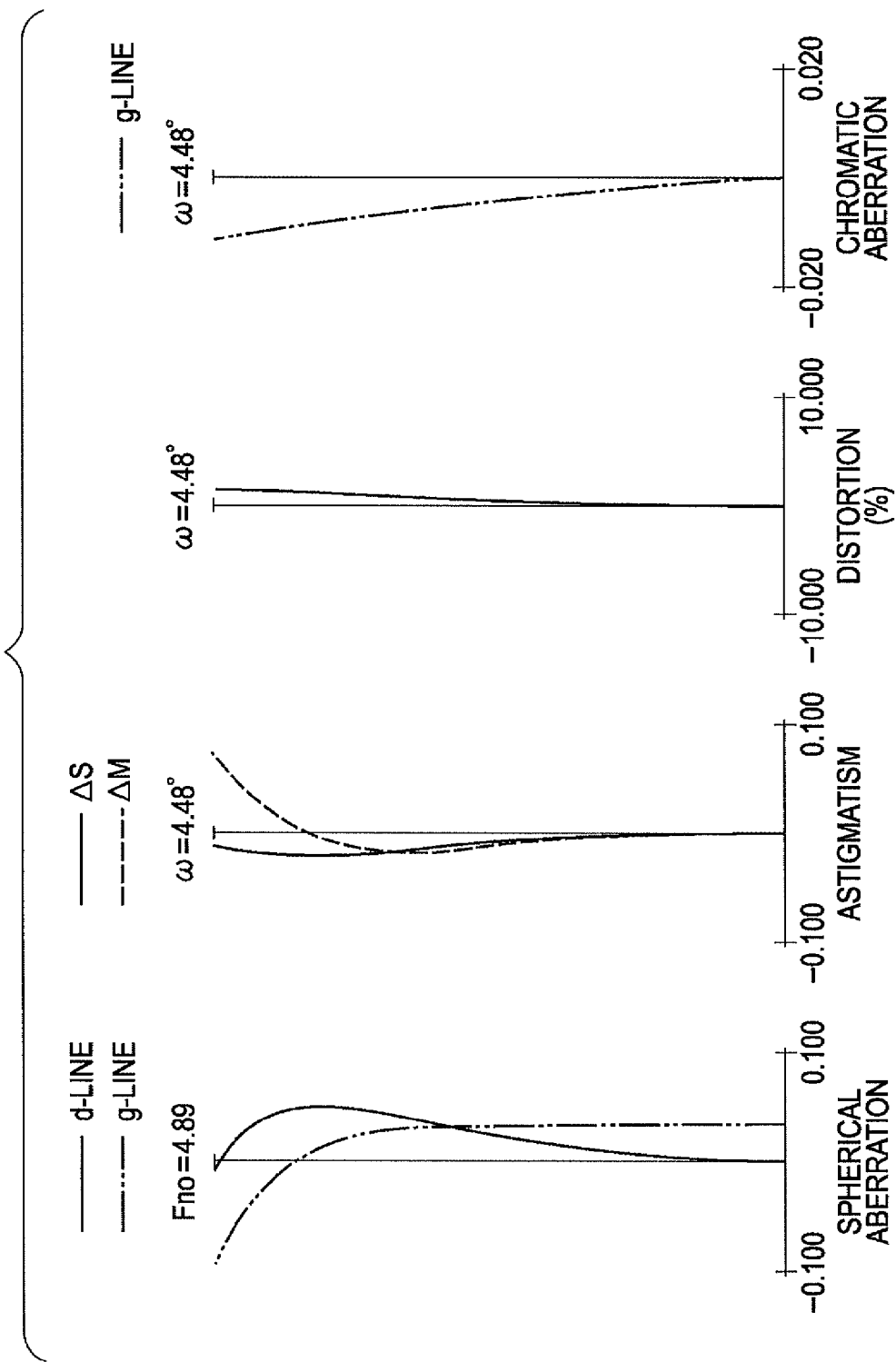

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens. The present invention is suitable for, for example, an image pickup apparatus, such as a video camera, an electronic still camera, a broadcast camera, or a surveillance camera, which includes a solid-state image pickup element, or a silver-halide film camera.

2. Description of the Related Art

Recently, image pickup apparatuses have become smaller with increased functionality. Accordingly, demand has increased for small, high-zoom-ratio (high-magnification-variation-ratio) zoom lenses having a small length and high resolution for use in imaging optical systems of the image pickup apparatuses.

To comply with such a demand, a rear-focus zoom lens has been proposed which performs focusing by moving lens units other than a first lens unit disposed at the object side.

In the rear-focus zoom lens, an effective diameter of the first lens unit is generally small compared to that in a zoom lens in which the first lens unit is moved during focusing. Therefore, the size of the entire lens system can be easily reduced.

In addition, a macro imaging operation can be easily performed, and the required driving force can be reduced since small, light lens units are moved. Therefore, quick focusing can be performed.

A four-unit zoom lens including four lens units, which are a first lens unit having a positive refractive power, a second lens unit having a negative refractive power, a third lens unit having a positive refractive power, and a fourth lens unit having a positive refractive power arranged in order from the object side to the image side, is known as the rear-focus zoom lens.

In the four-unit zoom lens, zooming is performed by moving the second lens unit, and focusing and compensation for image plane variation caused during zooming are performed by moving the fourth lens unit (see U.S. Pat. Nos. 5,963,378 and 6,166,864).

In addition, a zoom lens which performs zooming by moving each lens unit and focusing by moving the fourth lens unit is also known (see U.S. Pat. No. 7,190,529 and Japanese Patent Laid-Open No. 2007-212537).

In addition, U.S. Pat. No. 7,206,137 describes a four-unit or five-unit zoom lens including a first lens unit having a positive refractive power, a second lens unit having a negative refractive power, a third lens unit having a positive refractive power, and a fourth lens unit having a positive refractive power, which are arranged in order from the object side to the image side. This zoom lens performs zooming by moving the first to fourth lens units and focusing by moving the fourth lens unit.

In a five-unit zoom lens according to U.S. Pat. No. 7,206,137, a fifth lens unit is fixed during zooming.

In general, the zoom ratio can be increased and the size of the zoom lens can be reduced by increasing the refractive power of each lens unit included in the zoom lens and reducing the number of lenses.

However, as the refractive power of each lens surface increases, the lens thickness increases and the length of the lens system cannot be sufficiently reduced. In addition, it becomes difficult to correct aberrations, such as chromatic aberrations, at the telephoto end.

In addition, as the zoom ratio increases, the influence of assembly errors, such as tilting of each lens or lens unit, increases.

If the sensitivity to eccentricity of each lens or lens unit is high, the optical performance is largely reduced due to the eccentricity caused by assembly errors. As a result, the optical performance is also largely reduced in a vibration reducing state.

Therefore, in the zoom lens, the sensitivity to eccentricity of each lens or lens unit is set as low as possible.

In the above-described four-unit zoom lens or five-unit zoom lens, to achieve an increase in the zoom ratio and reduction in the size of the entire lens system while maintaining good optical performance, it is important to adequately set the refractive power of each lens unit, the lens structure, and the moving condition of each lens unit during zooming.

In particular, in order to effectively reduce the size of the entire lens system, it is important to reduce not only the overall length of the lens system but also a front lens diameter and the effective diameter of each of the lenses included in the first lens unit.

In general, lenses included in the first lens unit have a larger effective diameter than those of the lenses included in other lens units. Therefore, if the effective diameter of the first lens unit can be reduced, the lens thickness required to obtain a lens edge portion can also be reduced. As a result, the overall length of the lens system can be reduced.

In the case where the size of the entire lens system of the above-described four-unit or five-unit zoom lens is reduced, the effective diameter of the first lens unit is determined by the light-ray heights at a plurality of zoom positions.

For example, in the case where the first lens unit includes a first lens, a second lens, and a third lens arranged in order from the object side to the image side, the effective diameter of the first lens is determined by a marginal light ray height at the wide-angle end. In addition, the effective diameter of the second lens is determined by a marginal light ray height in an intermediate zoom range. The effective diameter of the third lens is determined by a marginal light ray height at the telephoto end.

Therefore, to reduce the size of the entire lens system, it is important to adequately set not only the refractive power of each lens unit but also the locus thereof during zooming in a zoom range including the intermediate zoom range.

SUMMARY OF THE INVENTION

According to an aspect of the present invention, a zoom lens includes a first lens unit having a positive refractive power; a second lens unit having a negative refractive power; a third lens unit having a positive refractive power; and a fourth lens unit having a positive refractive power. The first, second, third, and fourth lens units are arranged in order from the object side to the image side, respectively. During zooming from the wide-angle end to the telephoto end, the first lens unit moves along a locus that is convex toward the image side, the second lens unit moves along a locus that is convex toward the image side in a zoom range from the wide-angle end to an intermediate zoom position and along a locus that is convex toward the object side in a zoom range from the intermediate zoom position to the telephoto end, and the third lens unit moves such that the distance between the third lens unit and the second lens unit at the telephoto end is smaller than that at the wide-angle end. When f1 is a focal length of the first lens unit and ft is a focal length of the entire lens system of the zoom lens at the telephoto end, the following condition is satisfied:

$$0.3 < f1/ft < 1.1$$

Further features of the present invention will become apparent from the following description of exemplary embodiments with reference to the attached drawings.

BRIEF DESCRIPTION OF THE DRAWINGS

FIG. 1 is a sectional view of a zoom lens according to a first numerical example of the present invention at the wide-angle end.

FIGS. 2A to 2D are aberration diagrams of the zoom lens according to the first numerical example of the present invention.

FIGS. 4A to 4D are aberration diagrams of the zoom lens according to the second numerical example of the present invention.

FIGS. 6A to 6E are aberration diagrams of the zoom lens according to the third numerical example of the present invention.

FIG. 7 is a sectional view of a zoom lens according to a fourth numerical example of the present invention at the wide-angle end.

FIGS. 8A to 8E are aberration diagrams of the zoom lens according to the fourth numerical example of the present invention.

FIG. 9 is a sectional view of a zoom lens according to a fifth numerical example of the present invention at the wide-angle end.

FIGS. 10A to 10E are aberration diagrams of the zoom lens according to the fifth numerical example of the present invention.

DESCRIPTION OF THE EMBODIMENTS

Each of the zoom lenses according to the embodiments of the present invention includes a first lens unit having a positive refractive power, a second lens unit having a negative refractive power, a third lens unit having a positive refractive power, and a fourth lens unit having a positive refractive power in order from the object side to the image side.

During zooming from the wide-angle end to the telephoto end, the first lens unit moves along a locus that is convex toward the image side.

The second lens unit moves along a locus that is convex toward the image side in a zoom range from the wide-angle end to an intermediate zoom position, and along a locus that is convex toward the object side in a zoom range from the intermediate zoom position to the telephoto end.

In other words, the second lens unit moves along a locus having two vertices in an intermediate zoom range. The zoom position at which the second lens unit passes through the first vertex during zooming from the wide-angle end to the telephoto end will be hereinafter called a first intermediate zoom position, and the zoom position at which the second lens unit passes through the next vertex will be hereinafter called a second intermediate zoom position.

The third lens unit moves such that the distance between the third lens unit and the second lens unit decreases during zooming from the wide-angle end to the telephoto end.

The fourth lens unit can move along a locus that is convex toward the object side during zooming from the wide-angle end to the telephoto end.

The fourth lens unit can also move along a locus having one or more vertices (the number of vertices is not limited). In this case, a zoom position at which the fourth lens unit is positioned closest to the object side while an object at infinity is in focus will be hereinafter called a third intermediate zoom position.

Focusing is performed by moving the fourth lens unit.

FIG. 1 is a sectional view of a zoom lens according to a first embodiment at the wide-angle end (short-focal-length end). FIGS. 2A to 2D are aberration diagrams of the zoom lens according to the first embodiment at the wide-angle end, the first intermediate zoom position, the second intermediate zoom position, and the telephoto end (long-focal-length end), respectively.

Figure 2A:
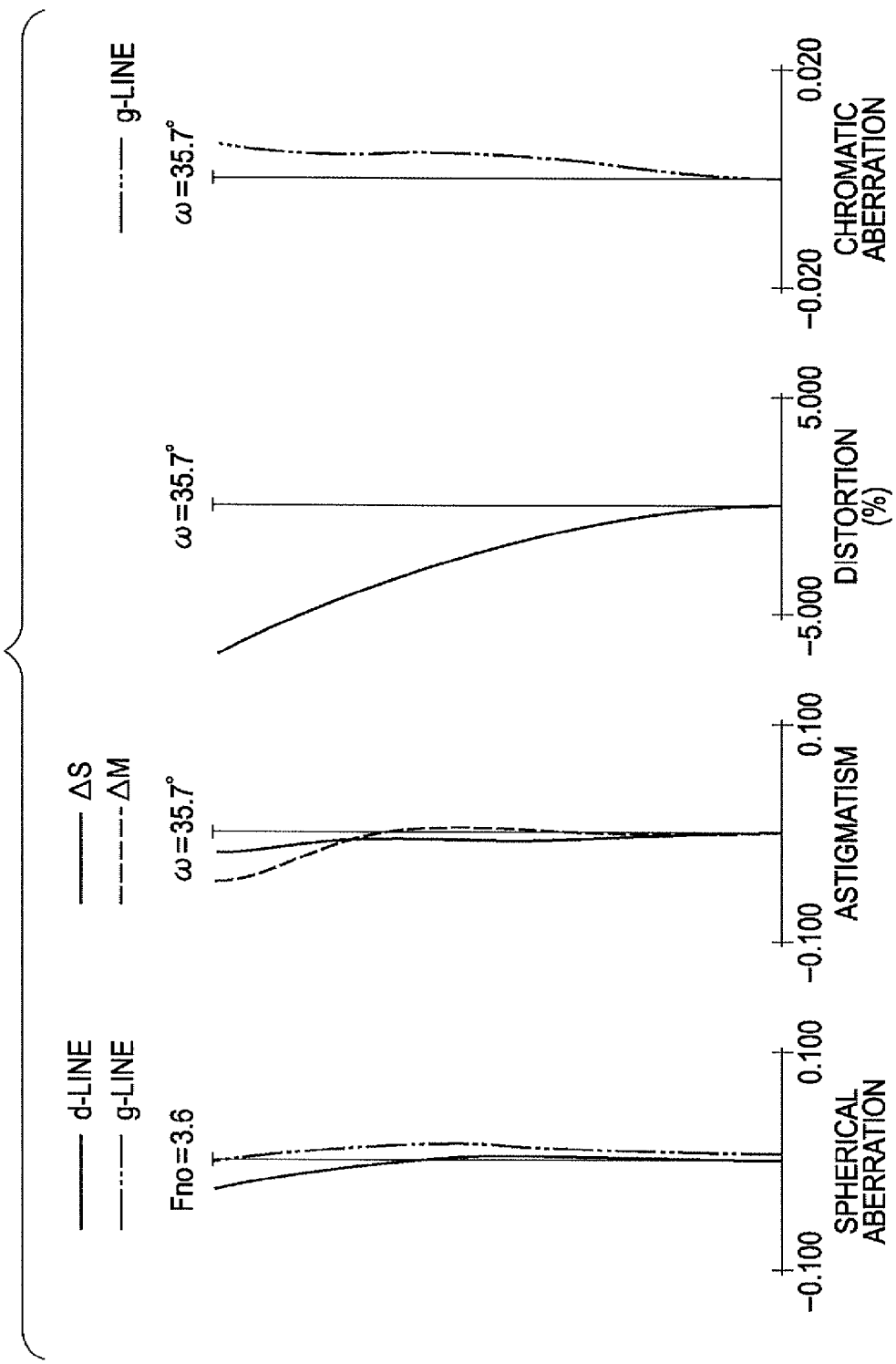
Figure 3:
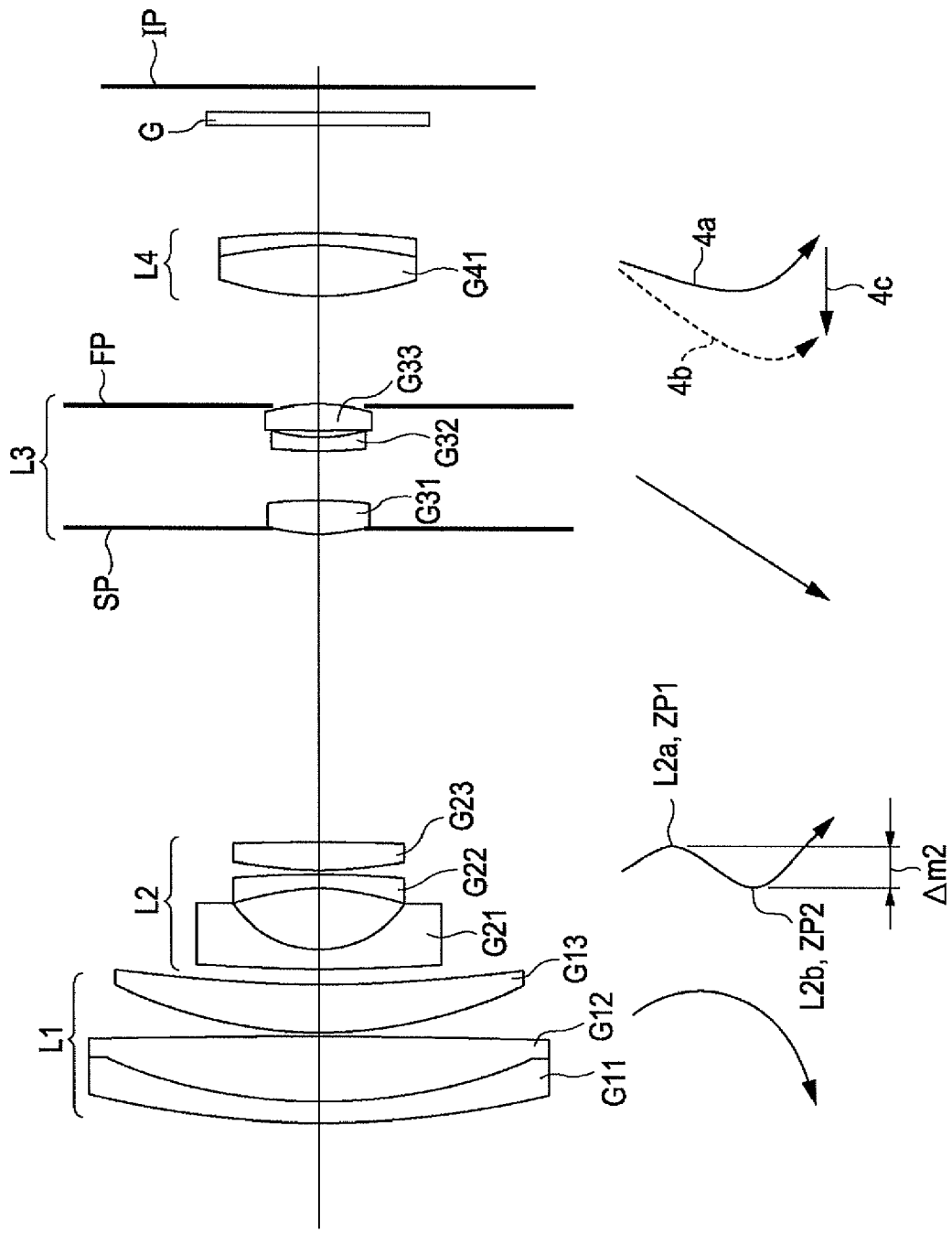
FIG. 3 is a sectional view of a zoom lens according to a second numerical example of the present invention at the wide-angle end.
Figure 4C:
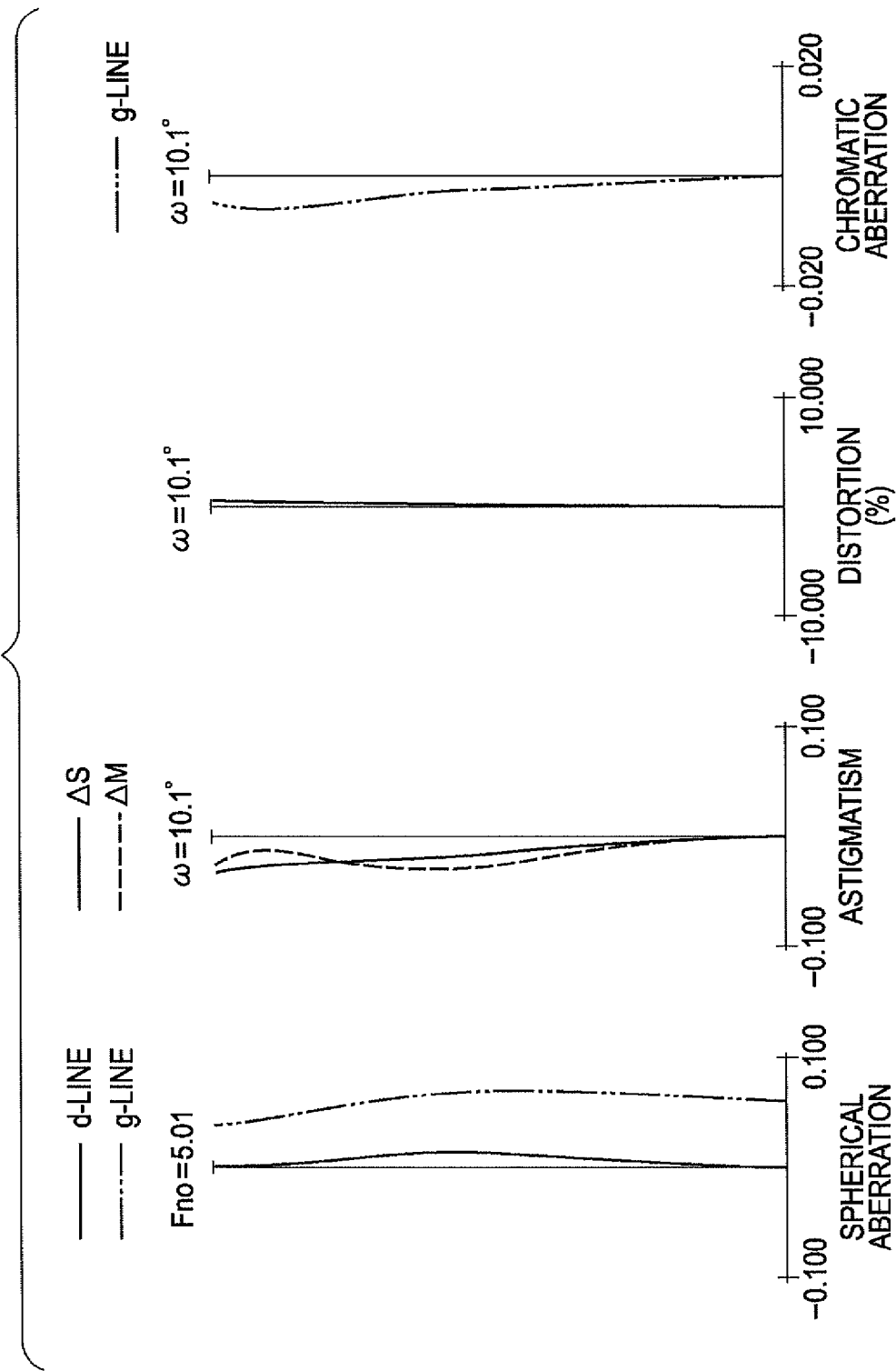

FIG. 3 is a sectional view of a zoom lens according to a second embodiment at the wide-angle end. FIGS. 4A to 4D are aberration diagrams of the zoom lens according to the second embodiment at the wide-angle end, the first intermediate zoom position, the second intermediate zoom position, and the telephoto end, respectively.

Figure 5:
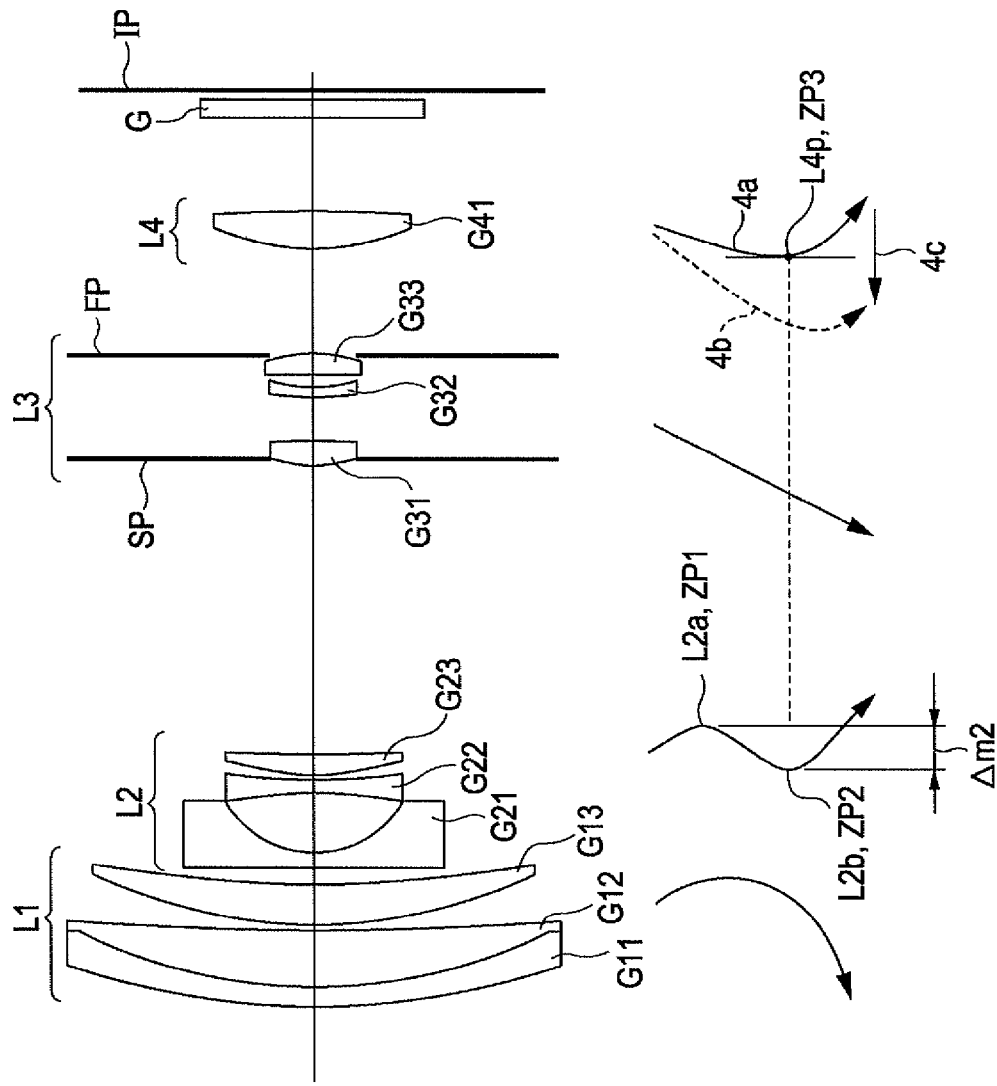
FIG. 5 is a sectional view of a zoom lens according to a third numerical example of the present invention at the wide-angle end.
Figure 6A:
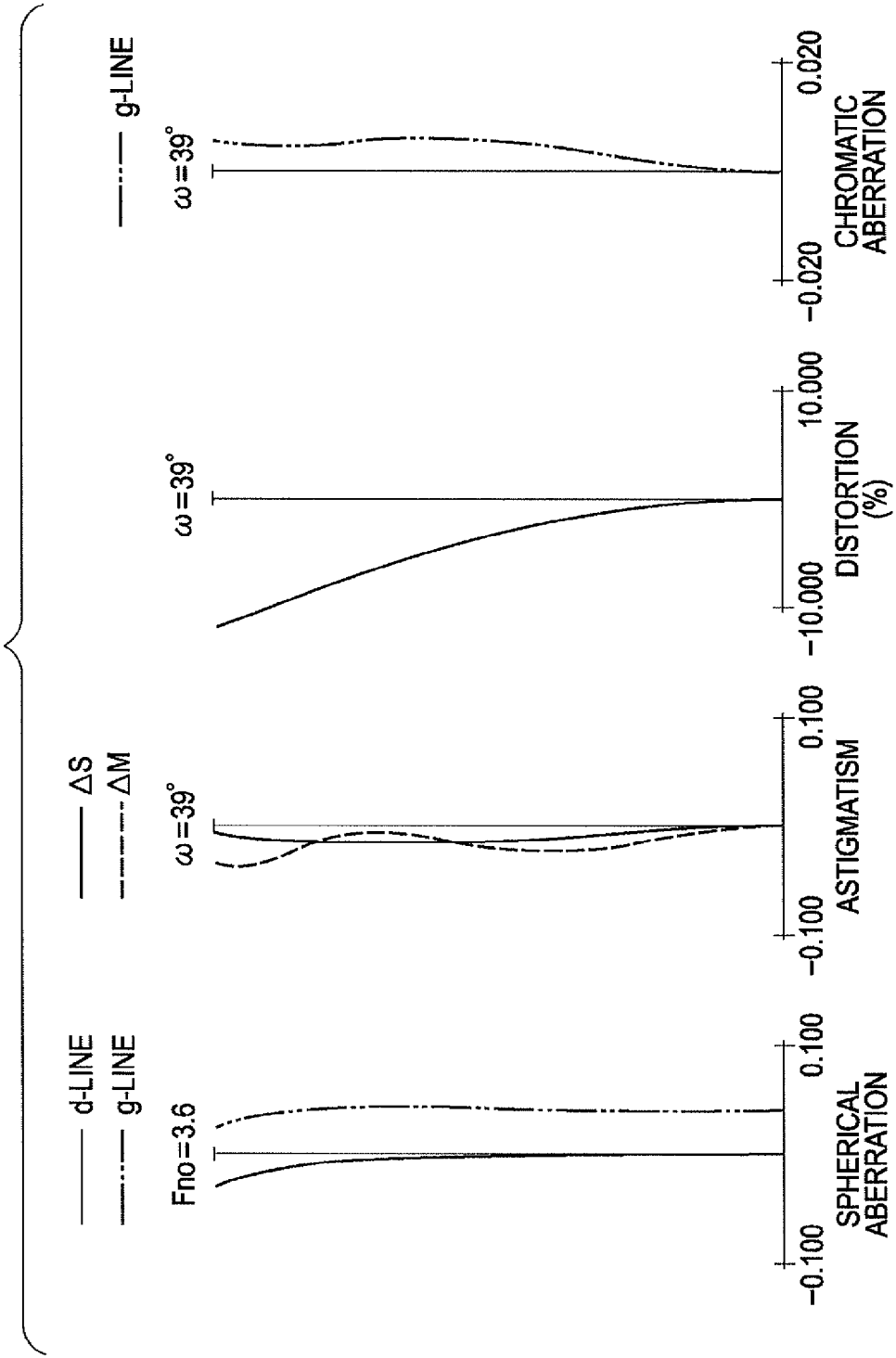
Figure 8A:
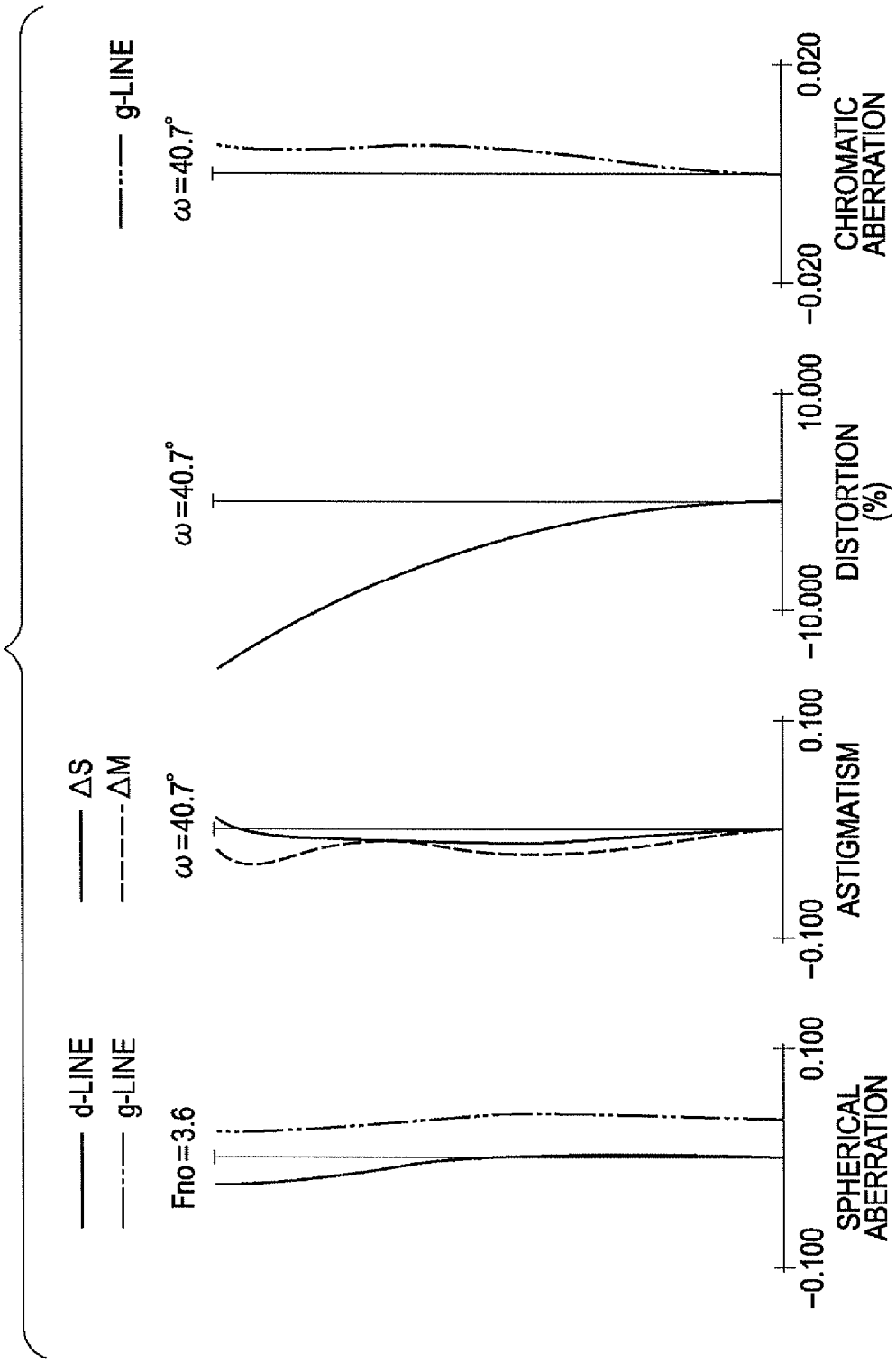
Figure 10A:
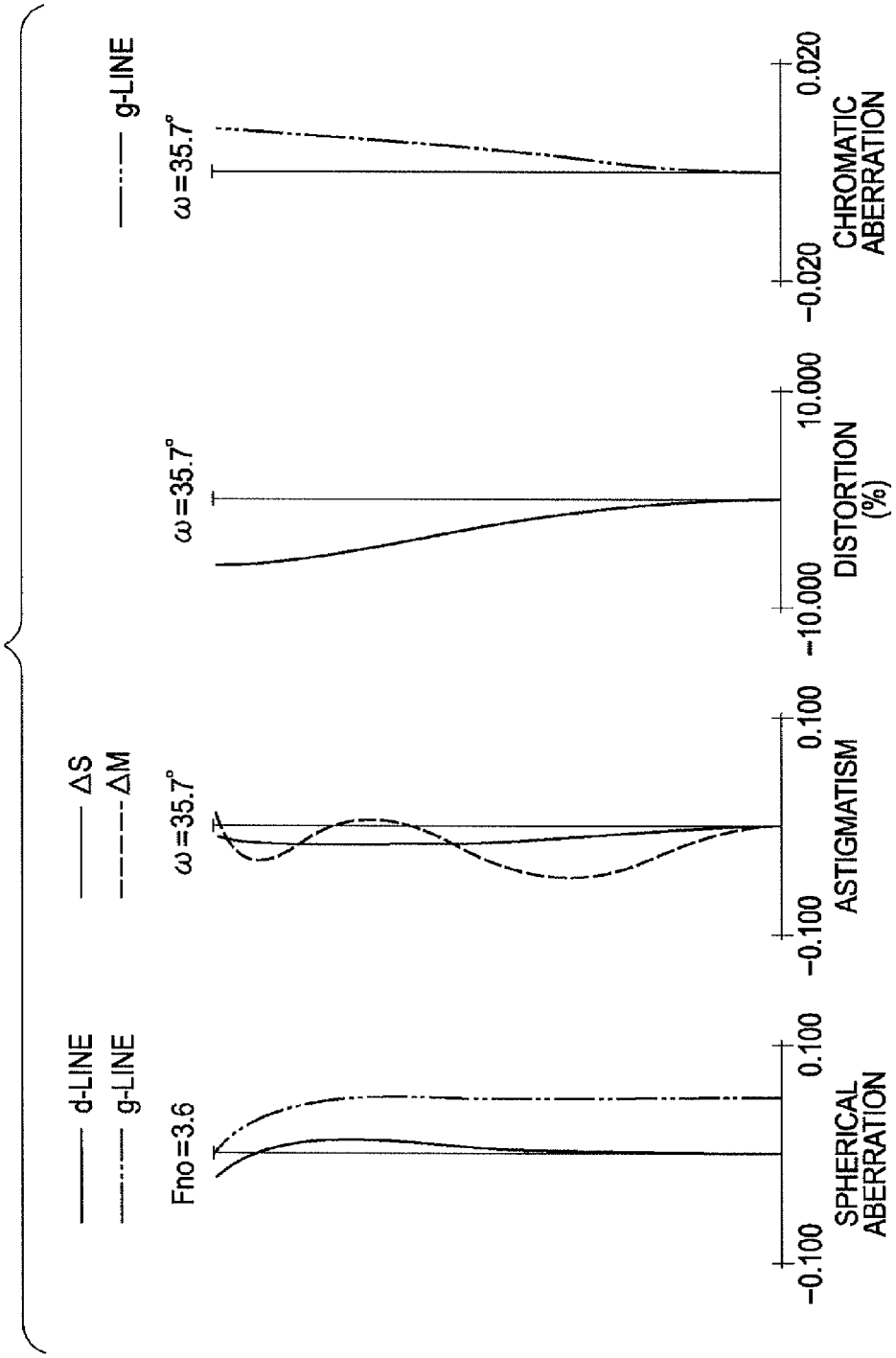
Figure 10B:
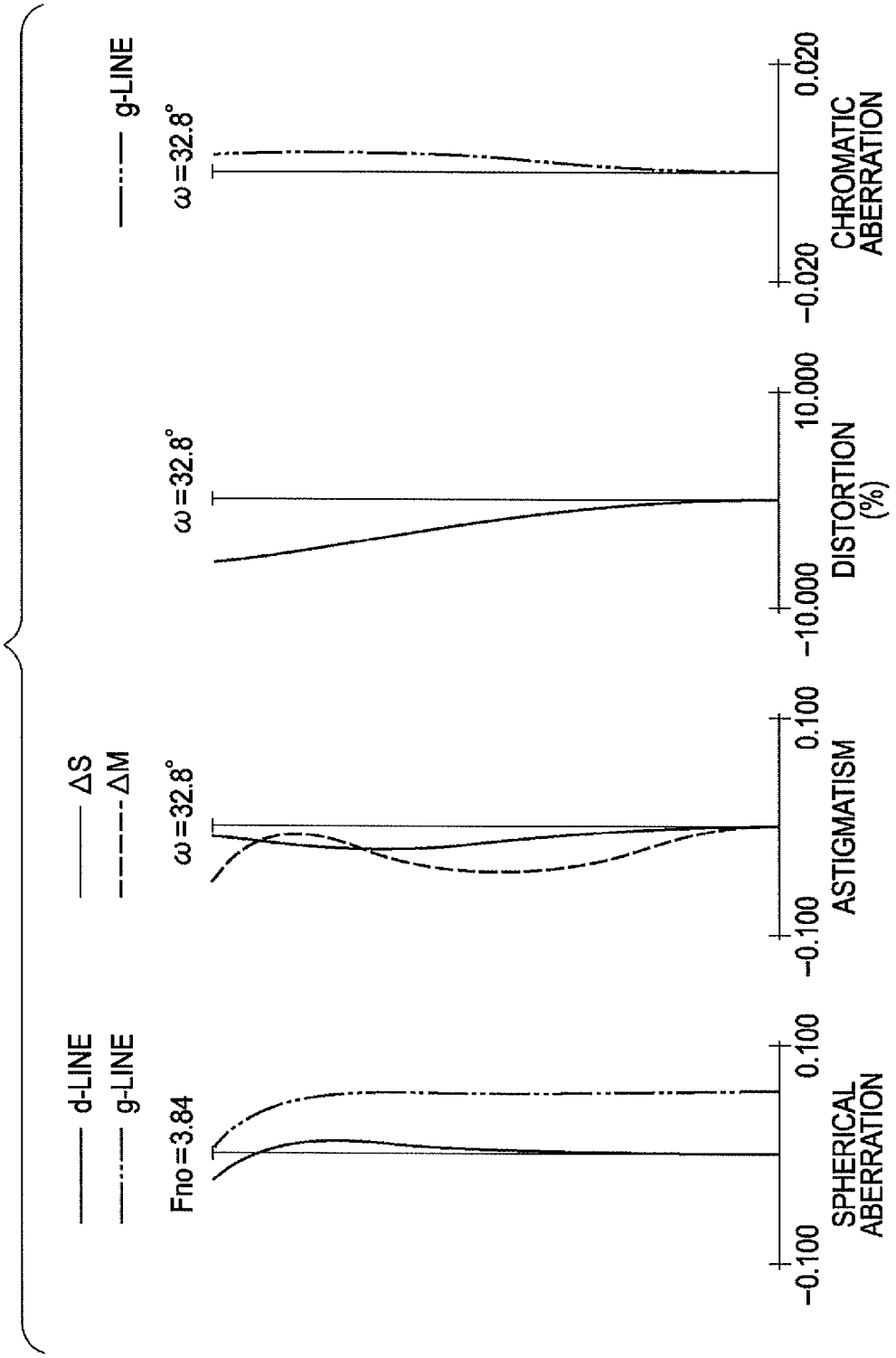

FIG. 5 is a sectional view of a zoom lens according to a third embodiment at the wide-angle end. FIGS. 6A to 6E are aberration diagrams of the zoom lens according to the third embodiment at the wide-angle end, the first intermediate zoom position, the second intermediate zoom position, the third intermediate zoom position, and the telephoto end, respectively.

FIG. 7 is a sectional view of a zoom lens according to a fourth embodiment at the wide-angle end. FIGS. 8A to 8E are aberration diagrams of the zoom lens according to the fourth embodiment at the wide-angle end, the first intermediate zoom position, the second intermediate zoom position, the third intermediate zoom position, and the telephoto end, respectively.

FIG. 9 is a sectional view of a zoom lens according to a fifth embodiment at the wide-angle end. FIGS. 10A to 10E are aberration diagrams of the zoom lens according to the fifth embodiment at the wide-angle end, the first intermediate zoom position, the second intermediate zoom position, the third intermediate zoom position, and the telephoto end, respectively.

Figure 11:
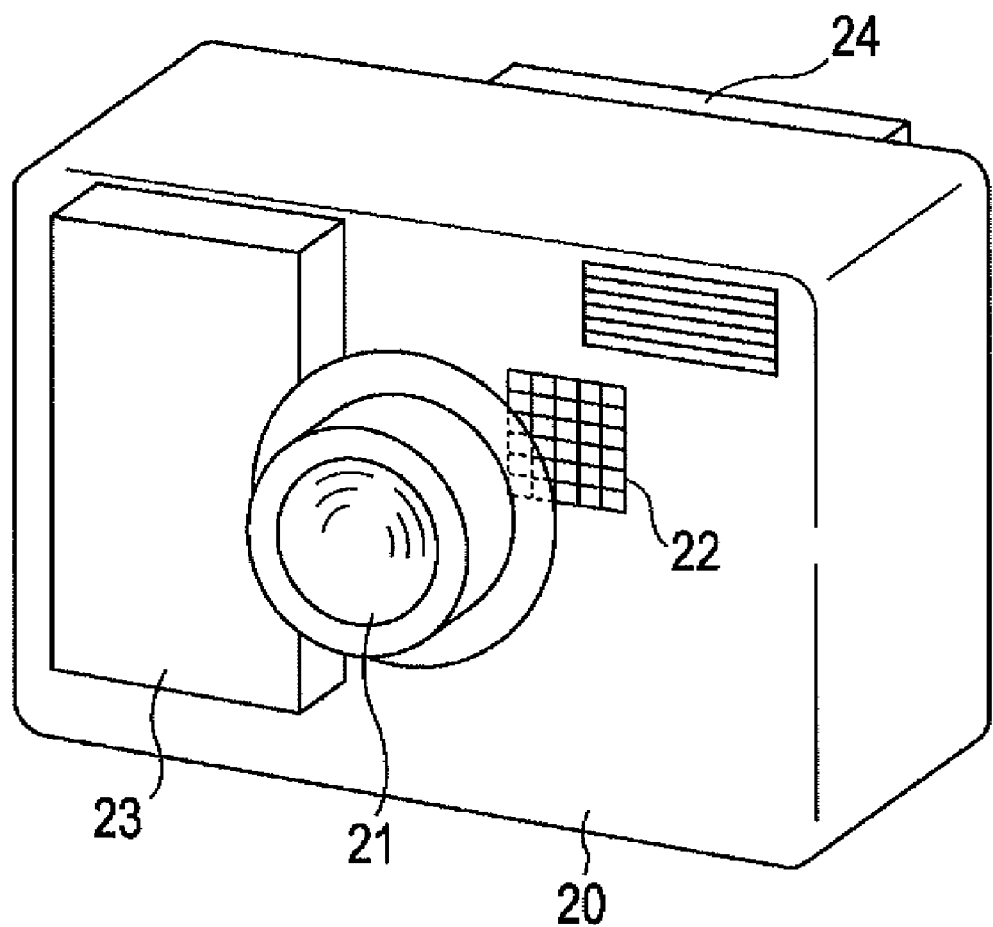
FIG. 11 is a schematic diagram illustrating the structure in which a zoom lens according to an embodiment of the present invention is included in a digital camera.
Figure 12:
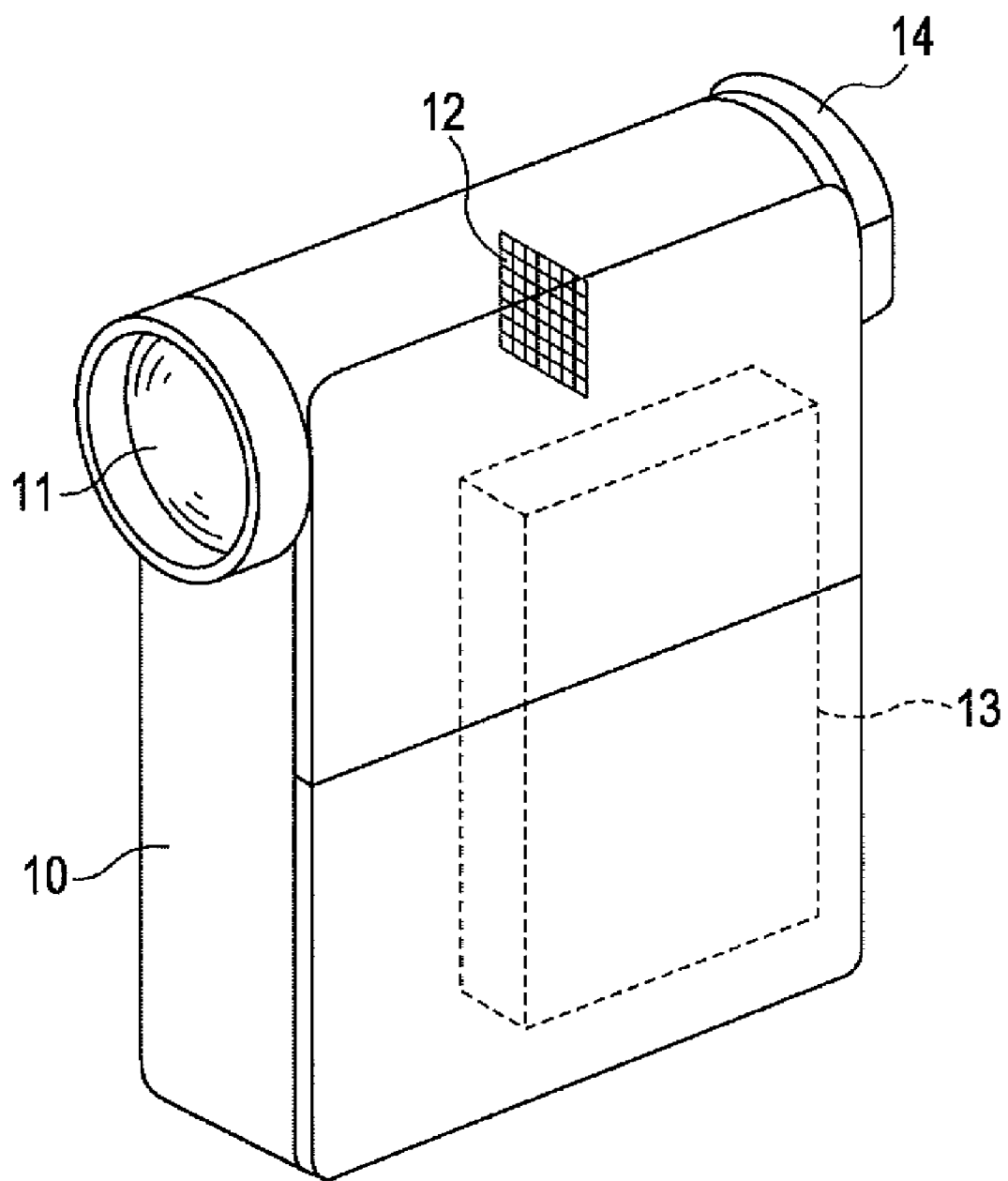
FIG. 12 is a schematic diagram illustrating the structure in which a zoom lens according to an embodiment of the present invention is included in a video camera.

FIGS. 11 and 12 are schematic diagrams illustrating the main parts of cameras (image pickup apparatuses) including a zoom lens according to an embodiment of the present invention.

The zoom lens according to each embodiment is an imaging lens system included in an image pickup apparatus, such as a video camera or a digital camera. In each sectional view, the left side shows the object side (front) and the right side shows the image side (rear).

In addition, in each sectional view, "i" denotes the number of each lens unit counted from the object side, and "Li" denotes the $i^{th}$ lens unit. Loci along which the lens units are moved during zooming from the wide-angle end to the telephoto end or during focusing are shown by the arrows.

SP denotes an aperture stop (F-number determining stop). FP denotes a flare stop for blocking unnecessary light. G denotes an optical block corresponding to, for example, an optical filter, a faceplate, a crystal low-pass filter, and an infrared-cut filter.

IP denotes an image plane. In the case where the zoom lens is used as an imaging optical system of a video camera or a digital still camera, an image pickup plane of a solid-state image pickup element (photoelectric conversion element), such as a CCD sensor or a CMOS sensor, is positioned at the image plane IP.

In the aberration diagrams, "d" and "g" show the d-line and the g-line, respectively, and ΔM and ΔS show a meridional image plane and a sagittal image plane, respectively. The chromatic aberration of magnification is shown by the g-line. In addition, "ω" is a half field angle and Fno is an F-number.

In each embodiment, the wide-angle end and the telephoto end are zoom positions corresponding to the states in which each of the magnification-varying lens units (the second lens unit L2 and the third lens unit L3) is at one and other ends of a mechanically moveable range along an optical axis.

In each embodiment, during zooming from the wide-angle end to the telephoto end, the first lens unit L1 moves along a locus that is convex toward the image side.

The second lens unit L2 moves along a locus that is convex toward the image side in a zoom range from the wide-angle end to an intermediate zoom position, and along a locus that is convex toward the object side in a zoom range from the intermediate zoom position to the telephoto end.

In each sectional view, points L2a and L2b on the locus of the second lens unit L2 are first and second vertices of the locus of the second lens unit L2.

The zoom position at which the second lens unit L2 passes through the first vertex L2a is the first intermediate zoom position. The zoom position at which the second lens unit L2 passes through the second vertex L2b is the second intermediate zoom position.

The third lens unit L3 moves such that the distance between the third lens unit L3 and the second lens unit L2 at the telephoto end is smaller than that at the wide-angle end.

The fourth lens unit L4 compensates for the image plane variation caused during zooming, and also performs focusing.

In the first, second, third, and fourth embodiments shown in FIGS. 1, 3, 5, and 7, respectively, the fourth lens unit L4 moves along a locus that is convex toward the object side during zooming from the wide-angle end to the telephoto end.

In the fifth embodiment shown in FIG. 9, the fourth lens unit L4 moves in the following manner during zooming from the wide-angle end to the telephoto end. That is, first, the fourth lens unit L4 moves along a locus that is convex toward the object side. Then, the fourth lens unit L4 moves along a locus that is convex toward the image side. Lastly, the fourth lens unit L4 moves along a locus that is convex toward the object side.

In this case, the locus of the fourth lens unit L4 includes three vertices.

The locus of the fourth lens unit L4 is not particularly limited as long as the locus includes a plurality of vertices. In the sectional views, a point L4p on the locus of the fourth lens unit L4 corresponds to a zoom position (third intermediate zoom position) at which the fourth lens unit L4 is positioned closest to the object side while the object at infinity is in focus.

Since the fourth lens unit L4 is moved along the locus that is convex toward the object side, the space between the third lens unit L3 and the fourth lens unit L4 can be effectively used and the overall lens length can be effectively reduced.

Focusing from an object at infinity to a close object at the telephoto end is performed by a rear-focus method in which the fourth lens unit L4 is moved forward as shown by the arrow 4c.

In each sectional view, the solid curve 4a and the dashed curve 4b respectively show the loci along which the fourth lens unit L4 is moved to compensate for the image plane variation during zooming from the wide-angle end to the telephoto end in the case where an object at infinity and a close object are in focus.

When f1 is a focal length of the first lens unit L1 and ft is a focal length of the entire lens system at the telephoto end, the following condition is satisfied:

$$0.3 < f1/ft < 1.1 \qquad (1)$$

The technical meaning of Conditional Expression (1) will now be described.

Conditional Expression (1) relates to the refractive power of the first lens unit L1 with respect to the refractive power of the entire lens system at the telephoto end.

If the refractive power of the first lens unit L1 is too low and the value of Conditional Expression (1) is greater than the upper limit thereof, the amount of movement of the first lens unit L1 during zooming is increased and the size of the lens increases accordingly.

If the refractive power of the first lens unit L1 is too high and the value of Conditional Expression (1) is less than the lower limit thereof, the chromatic aberration of magnification is increased at the wide-angle end and the axial chromatic aberration is increased at the telephoto end. Therefore, it becomes difficult to obtain high optical performance over the entire zoom range.

During zooming from the wide-angle end to the telephoto end, the first lens unit L1 moves along a locus that is convex toward the image side. Therefore, the entrance pupil distance can be reduced in a zoom range from the wide-angle end to an intermediate zoom range (between the first intermediate zoom position ZP1 and the second intermediate zoom position ZP2). As a result, the effective diameter of the front lens can be reduced.

The second lens unit L2 moves along a locus that is convex toward the image side in a zoom range from the wide-angle end to an intermediate zoom position, and then moves along a locus that is convex toward the object side in a zoom range from the intermediate zoom position to the telephoto end. Since the second lens unit L2 moves along such a locus, the effective diameters of the lenses included in the first lens unit L1 can be easily reduced.

In particular, since the second lens unit L2 moves along the locus that is convex toward the image side in the zoom range from the wide-angle end to the intermediate zoom position, the entrance pupil distance can be reduced at a zoom position near the wide-angle end. As a result, the effective diameter of the front lens (first lens unit L1) can be reduced.

At the zoom position near the wide-angle end, a marginal light ray passes through the front lens at a high position above the optical axis. Therefore, the second lens unit L2 is moved along with the first lens unit L1 toward the image side in the zoom range from the wide-angle end to the intermediate zoom position, so that the distance between the front lens and the stop can be reduced. As a result, the effective diameter of the front lens can be reduced.

If the diameter of the front lens, which has a larger effective diameter than those of the other lens units included in the zoom lens, is reduced, the lens thickness to obtain a lens edge portion having a sufficient dimension for manufacturing the zoom lens can also be reduced.

At a zoom position near the wide-angle end, a marginal light ray passes through each lens surface in the first lens unit L1 at a high incidence height. Therefore, among the lenses included in the first lens unit L1, the effective diameter of the lens close to the image side is often determined by the incidence height of the marginal light ray in a zoom range from the intermediate zoom position to the telephoto end for the following reasons.

That is, in the zoom range from the intermediate zoom position to the telephoto end, the first lens unit L1 moves toward the object side and away from the stop SP to ensure the magnification variation ratio obtained by the movement of the second lens unit L2. Therefore, the incidence height of the marginal light ray which passes through each lens in the first lens unit L1 increases.

The second lens unit L2 includes a negative meniscus lens G21 having a concave surface on the image side. Therefore, the entrance pupil position is moved toward the object side when the second lens unit L2 is moved toward the object side.

Therefore, in the zoom range from the intermediate zoom position to the telephoto end, the second lens unit L2 is temporarily moved along a locus that is convex toward the object side. Accordingly, the entrance pupil position is moved toward the object side in a zoom range near the second intermediate zoom position ZP2, so that the effective diameter of the lens structure of the first lens unit L1 can be reduced.

During zooming from the wide-angle end to the telephoto end, the third lens unit moves toward the object side such that the distance between the third lens unit and the second lens unit decreases. Accordingly, the third lens unit L3 provides a magnification-varying function, and variations in the spherical aberration and the field curvature during zooming can be effectively reduced.

The optical system of each embodiment is structured as described above. Therefore, a small, high-zoom-ratio optical system capable of correcting aberrations, such as the axial chromatic aberration, the chromatic aberration of magnification, the spherical aberration, and the field curvature, over the entire zoom range and providing high optical performance can be obtained.

In each embodiment, one or more of the conditions provided below can be additionally satisfied.

In the conditional expressions given below, fw is a focal length of the entire lens system at the wide-angle end.

In addition, f2 and f3 are the focal lengths of the second lens unit L2 and the third lens unit L3, respectively.

In addition, m2 and m3 are displacements of the second lens unit L2 and the third lens unit L3, respectively, along the optical axis between the wide-angle end and the telephoto end. The sign of the displacements is positive when the lens units are moved toward the image side during zooming from the wide-angle end to the telephoto end and is negative when the lens units are moved in the opposite direction.

In the locus of the second lens unit L2 during zooming from the wide-angle end to the telephoto end, $\Delta m2$ is the distance between the positions of the second lens unit L2 on the optical axis which correspond to the two vertices L2a and L2b.

In addition, $\beta 2w$ and $\beta 2t$ are the lateral magnifications of the second lens unit L2 at the wide-angle end and the telephoto end, respectively, and $\beta 3w$ and $\beta 3t$ are the lateral magnifications of the third lens unit L3 at the wide-angle end and the telephoto end, respectively.

Here, one or more of the following conditions can be satisfied:

$$-1.8 < f2/fw < -1.0 \quad (2)$$

$$0 \leq |m2/m3| < 1.7 \quad (3)$$

$$0.01 < |\Delta m2/f2| < 0.50 \quad (4)$$

$$7.0 < (\beta 2t \cdot \beta 3t)/(\beta 2w \cdot \beta 3w) < 15.0 \quad (5)$$

$$0.5 < f3/(fw \cdot ft)^{1/2} < 1.1 \quad (6)$$

The technical meaning of each of the conditional expressions will now be described.

Conditional Expression (2) relates to the refractive power of the second lens unit L2.

If the refractive power of the second lens unit L2 is too low (weak) and the value of Conditional Expression (2) is greater than the upper limit thereof, the amount of movement of the first lens unit L1 during zooming becomes too large and the effective diameter of the lenses included in the first lens unit L1 increases accordingly. As a result, the overall lens length increases.

If the refractive power of the second lens unit L2 is too high (strong) and the value of Conditional Expression (2) is less than the lower limit thereof, variations in the chromatic aberration of magnification, the coma aberration, etc., which occur in the second lens unit L2 during zooming are excessively increased. Therefore, it becomes difficult to correct the aberrations with the other lens units.

Conditional Expression (3) relates to the amounts of movement of the second lens unit L2 and the third lens unit L3 during zooming.

If the amount of movement of the third lens unit L3 is too small and the value of Conditional Expression (3) is greater than the upper limit thereof, the magnification variation ratio provided by the third lens unit L3 is too small. Therefore, it becomes difficult to obtain a high zoom ratio (high magnification variation ratio).

If the refractive power of the third lens unit L3 is increased to obtain a high zoom ratio, the spherical aberration and the field curvature which occur at the third lens unit L3 are excessively increased. Therefore, it becomes difficult to correct the aberrations with the other lens units.

When the value of Conditional Expression (3) is equal to the lower limit thereof, the position of the second lens unit L2 on the optical axis at the wide-angle end is the same as that at the telephoto end.

Also in this case, the second lens unit L2 is moved during zooming in the intermediate zoom range, and the first lens unit L1 is moved so that sufficient magnification variation ratio can be provided by the second lens unit L2.

Conditional Expression (4) relates to the locus of the second lens unit L2.

If the distance $\Delta m2$ is too large and the value of Conditional Expression (4) is greater than the upper limit thereof, variations in the field curvature and the astigmatism in the intermediate zoom range between the first intermediate zoom position ZP1 and second intermediate zoom position ZP2, which respectively correspond to the two vertices L2a and L3b on the locus of the second lens unit L2, are increased.

If the distance $\Delta m2$ is too small and the value of Conditional Expression (4) is less than the lower limit thereof, the effect of moving the entrance pupil position toward the object side by moving the second lens unit L2 toward the object side cannot be sufficiently provided in the intermediate zoom range. As a result, it becomes difficult to reduce the effective diameter of each lens in the first lens unit L1.

Conditional Expression (5) relates to the magnification variation ratios of the second lens unit L2 and the third lens unit L3.

If the magnification variation ratios of the second lens unit L2 and the third lens unit L3 are too high and the value of Conditional Expression (5) is greater than the upper limit thereof, variations in aberrations, such as the chromatic aberration of magnification, the coma aberration, the field curvature, etc., during zooming are excessively increased.

If the magnification variation ratios of the second lens unit L2 and the third lens unit L3 are too low and the value of Conditional Expression (5) is less than the lower limit thereof, it becomes difficult to obtain a high zoom ratio (high magnification variation ratio) in the entire lens system.

Conditional Expression (6) relates to the refractive power of the third lens unit L3.

If the refractive power of the third lens unit L3 is too weak and the value of Conditional Expression (6) is greater than the upper limit thereof, the moving distance of the third lens unit L3 during zooming increases. As a result, the overall lens length increases.

If the refractive power of the third lens unit L3 is too strong and the value of Conditional Expression (6) is less than the lower limit thereof, the spherical aberration and the field curvature which occur at the third lens unit L3 are excessively increased and it becomes difficult to correct the aberrations with the other lens units.

The numerical ranges of Conditional Expressions (1) to (6) can be set as follows:

$$0.45 < f1/ft < 1.00 \quad (1a)$$

$$-1.7 < f2/fw < -1.1 \quad (2a)$$

$$0 \leq |m2/m3| < 1.5 \quad (3a)$$

$$0.01 < |\Delta m2/f2| < 0.40 \quad (4a)$$

$$7.5 < (\beta 2t \cdot \beta 3t)/(\beta 2w \cdot \beta 3w) < 14.0 \quad (5a)$$

$$0.6 < f3/(fw \cdot ft)^{1/2} < 1.0 \quad (6a)$$

In addition, the numerical ranges of Conditional Expressions (1) to (6) can also be set as follows:

$$0.55 < f1/ft < 0.90 \quad (1b)$$

$$-1.6 < f2/fw < -1.2 \quad (2b)$$

$$0 \leq |m2/m3| < 1.30 \quad (3b)$$

$$0.01 < |\Delta m2/f2| < 0.3 \quad (4b)$$

$$8.0 < (\beta 2t \cdot \beta 3t)/(\beta 2w \cdot \beta 3w) < 13.0 \quad (5b)$$

$$0.7 < f3/(fw \cdot ft)^{1/2} < 0.9 \quad (6b)$$

In such a case, the above-described effects of the respective conditional expressions can be enhanced.

The second lens unit L2 can be composed of a plurality of negative lenses and one or more positive lenses arranged in order from the object side to the image side.

When the second lens unit L2 has such a structure, the refractive power required for zooming can be reliably provided and variations in aberrations, such as the chromatic aberration of magnification and the coma aberration, during zooming can be reliably corrected.

At least one of the negative lenses included in the second lens unit L2 can have an aspherical surface.

In the case where the aspherical surface is included, the distortion and the astigmatism can be reliably corrected at the wide-angle end.

The third lens unit L3 can be composed of one or more positive lens components and one or more negative lens components. Here, the lens component includes both a single lens and a cemented lens.

When the third lens unit L3 has the above-described structure, the refractive power required for zooming can be reliably provided and variations in aberrations, such as the spherical aberration and the field curvature, during zooming can be reliably corrected.

At least one of positive lenses included in the third lens unit L3 can have an aspherical surface.

In the case where the aspherical surface is included, variation in the spherical aberration during zooming can be reliably corrected.

The characteristics of the lens structure of each embodiment will now be described. Unless particularly specified otherwise, elements included in the lens system are explained in order from the object side to the image side.

In each embodiment, the first lens unit L1 includes a cemented lens including a negative meniscus lens G11 having a convex surface on the object side and a positive lens G12, and a positive meniscus lens G13 having a convex surface on the object side.

Since the first lens unit L1 is composed of three lenses, the zoom ratio (magnification variation ratio) can be increased and corrections of the spherical aberration and the chromatic aberrations including the axial chromatic aberration and the chromatic aberration of magnification can be reliably performed.

The second lens unit L2 includes three lenses, which are the negative meniscus lens G21 having a convex surface on the object side, a negative lens G22 having a concave surface on the image side, and a positive lens G23 having a convex surface on the object side in order from the object side. Accordingly, variations in aberrations during zooming can be reliably reduced.

The lens surfaces of the negative lens G21 are aspherical at both sides thereof, so that the distortion and the astigmatism can be effectively corrected at, in particular, the wide-angle end.

According to each embodiment, the third lens unit L3 includes two positive lenses and a single negative lens.

More specifically, in the first to fourth embodiments, the third lens unit L3 includes a fixed stop SP, a positive lens G31 having a convex surface on the object side, a negative lens G32 having a concave surface on the image side, and a positive lens G33 having a convex surface on the image side in order from the object side.

In the case where the third lens unit L3 has such a structure, the principal point of the third lens unit L3 on the object side can be positioned near the surface of the positive lens G31 on the object side. Therefore, the diameter of the front lens can be reduced.

In order to reliably correct variations in the field curvature and the astigmatism over the entire zoom range, a predetermined air gap must be provided between the positive lens G31 and the negative lens G32.

When d3a is the air gap between the positive lens G31 and the negative lens G32 and d3 is a distance between a first lens surface and a last lens surface in the third lens unit L3, the following condition can be satisfied:

$$0.25 < d3a/d3 < 0.5 \quad (7)$$

If the air gap d3a is too large and the value of Conditional Expression (7) is greater than the upper limit thereof, the overall lens length is increased.

If the air gap d3a is too small and the value of Conditional Expression (7) is less than the lower limit thereof, variations in the field curvature and the astigmatism during zooming are excessively increased and it becomes difficult to correct the aberrations with the other lens units.

The numerical range of Conditional Expression (7) can be set as follows:

$$0.30 < d3a/d3 < 0.46 \quad (7a)$$

In addition, the numerical range of Conditional Expression (7) can also be set as follows:

$$0.33 < d3a/d3 < 0.43 \quad (7b)$$

In such a case, the effect corresponding to the conditional expression can be enhanced.

The air gap between the positive lens G31 and the negative lens G32 can be effectively used by arranging a light-quantity varying element, such as a variable stop or an ND filter, a shutter, etc., in the air gap.

Therefore, it is not necessary to provide a space for arranging the light-quantity varying element and the shutter on the object side of the third lens unit L3, and the second lens unit L2 and the third lens unit L3 can be positioned close to each other at the telephoto end. As a result, the overall lens length can be reduced.

One of the light-quantity varying element and the shutter can also be disposed between the third lens unit L3 and the fourth lens unit L4.

In the fifth embodiment, the third lens unit L3 includes a variable stop SP, a positive lens G31 having a convex surface on the object side, and a cemented lens including a positive lens G32 having a convex surface on the object side and a negative lens G33 having a concave surface on the image side in order from the object side.

In the case where the third lens unit L3 has such a structure, the distance between the positive lens G31 and the positive lens G32 can be reduced compared to those in the structures of the first to fourth embodiments. Therefore, the thickness of the third lens unit L3 can be reduced.

Therefore, the retracted length in the state in which the lens units are retracted can be reduced.

In the structures of the first to fourth embodiments, the shutter and the light-quantity adjusting element, such as an ND filter, can be arranged between the second lens unit L2 and the third lens unit L3, in the third lens unit L3, or between the third lens unit L3 and the fourth lens unit L4.

In each of the above-described embodiments, a part of the third lens unit L3 or the entire body thereof may be moved in a direction having a component perpendicular to the optical axis so as to correct an image blur caused when the zoom lens is vibrated.

In addition, in each embodiment, a flare stop FP for blocking unnecessary light is disposed at a position closest to the image side in the third lens unit L3.

In each embodiment, the fourth lens unit L4 is composed of a single positive lens component.

In the first and third to fifth embodiments, the fourth lens unit L4 is composed of a single positive lens to reduce the size of the lens system.

In the fourth embodiment, the lens surface of the positive lens in the fourth lens unit L4 on the object side thereof is aspherical, so that variations in the field curvature and the astigmatism during focusing can be reduced.

A similar effect can also be obtained when the lens surface on the image side is aspherical.

In the second embodiment, the fourth lens unit L4 is composed of a cemented lens including a positive lens and a negative lens, so that variations in the chromatic aberration of magnification and the field curvature during focusing can be reduced at the telephoto end.

In each embodiment, in the case where the zoom lens is used in an electronic image pickup apparatus including a solid-state image pickup element, the variation in distortion which occurs during zooming can be electronically corrected in a digital process performed for obtained images.

First to fifth numerical examples, which correspond to the first to fifth embodiments of the present invention, will now be described.

In each numerical example, the surface number shows the number of each optical surface counted from the object side. In addition, r shows the radius of curvature of each optical surface, d shows the distance between the surfaces, and nd and vd show the refractive index and the Abbe number, respectively, of the material of each optical component for the d-line.

Back focus (BF) is an equivalent air distance between the last lens surface and a paraxial image plane. The overall lens length is defined as the sum of the distance between the first lens surface and the last lens surface and the back focus (BF). The unit of length is mm.

When K is the eccentricity, A4, A6, A8, and A10 are the aspherical coefficients, and x is the position of the aspherical surface in the optical axis direction with respect to the vertex of the aspherical surface at a height H from the optical axis, the shape of the aspherical surface is expressed as follows:

$$X = \frac{(1/R)H^2}{1 + \sqrt{1 - (1+K)(H/R)^2}} + A4H^4 + A6H^6 + A8H^8 + A10H^{10}$$

In the above equation, R is a radius of curvature. In addition, "e-Z" means "$10^{-Z}$." Table 1 provided below shows the relationship between the above-described conditional expressions and the numerical examples. In addition, "f" shows the focal length, FNo shows the F-number, and ω shows a half field angle.

In each of the first to fifth numerical example, the two surfaces closest to the image side are surfaces which form a filter member. In each of the first to fourth embodiments, the value of d12 is negative since the aperture stop SP and the lens surface closest to the object side in the third lens unit L3 are counted in that order from the object side to the image side.

Similarly, in each of the first to fourth embodiments, the value of d18 is negative since the lens surface closest to the image side in the third lens unit L3 and the flare sop FP are counted in that order from the object side to the image side.

First Numerical Example

Surface Data

| Surface Number | r | d | nd | vd |
|---|---|---|---|---|
| 1 | 37.991 | 1.10 | 1.84666 | 23.9 |
| 2 | 23.467 | 3.05 | 1.48749 | 70.2 |
| 3 | 410.568 | 0.20 | | |
| 4 | 24.414 | 2.35 | 1.69680 | 55.5 |
| 5 | 92.061 | (variable) | | |
| 6* | 105.108 | 1.00 | 1.84862 | 40.0 |
| 7* | 4.720 | 2.80 | | |
| 8 | −17.005 | 0.60 | 1.71300 | 53.9 |
| 9 | 114.238 | 0.20 | | |
| 10 | 12.565 | 1.30 | 1.94595 | 18.0 |
| 11 | 54.984 | (variable) | | |
| 12(stop) | ∞ | −0.20 | | |
| 13* | 9.406 | 1.65 | 1.76753 | 49.3 |
| 14 | −28.447 | 2.50 | | |
| 15 | 42.142 | 0.60 | 1.92286 | 18.9 |
| 16 | 8.493 | 0.49 | | |
| 17 | −59.394 | 1.25 | 1.48749 | 70.2 |
| 18 | −7.856 | −0.10 | | |

-continued

| Surface Data | | | | |
|---|---|---|---|---|
| Surface Number | r | d | nd | vd |
| 19(flare stop) | ∞ | (variable) | | |
| 20 | 12.400 | 1.75 | 1.48749 | 70.2 |
| 21 | 601.583 | (variable) | | |
| 22 | ∞ | 1.00 | 1.51633 | 64.1 |
| 23 | ∞ | 0.87 | | |
| image plane | ∞ | | | |

Aspherical Surface Data
6th Surface
  K=0.00000e+000  A 8=−6.14276e-008  A10=9.77866e-010
7th Surface
  K=−1.56696e+000 A 4=1.44884e-003 A 6=1.52014e-005
  A 8=−4.75276e-007
13th Surface
  K=−4.57127e+000 A 4=3.14925e-004 A 6=−5.97405e-006
  A 8=−9.88344e-008

| Other Data Zoom Ratio 9.64 | | | | |
|---|---|---|---|---|
| | Wide Angle | Intermediate 1 | Intermediate 2 | Telephoto |
| Focal Length | 5.13 | 8.60 | 13.60 | 49.41 |
| F-number | 3.60 | 4.29 | 4.76 | 5.44 |
| Field Angle | 35.68 | 24.25 | 15.91 | 4.48 |
| Image Height | 3.68 | 3.88 | 3.88 | 3.88 |
| Overall Lens Length | 47.67 | 46.34 | 51.86 | 65.12 |
| BF | 6.63 | 9.59 | 11.54 | 6.95 |
| d 5 | 0.80 | 2.59 | 7.93 | 21.91 |
| d11 | 14.55 | 7.37 | 4.47 | 0.60 |
| d19 | 5.15 | 6.25 | 7.38 | 15.13 |
| d21 | 5.10 | 8.06 | 10.02 | 5.42 |

| Zoom Lens Unit Data | | |
|---|---|---|
| Unit No. | Front Surface | Focal Length |
| 1 | 1 | 37.39 |
| 2 | 6 | −6.64 |
| 3 | 12 | 12.05 |
| 4 | 20 | 25.95 |

Second Numerical Example

| Surface Data | | | | |
|---|---|---|---|---|
| Surface Number | r | d | nd | vd |
| 1 | 48.335 | 1.15 | 1.84666 | 23.9 |
| 2 | 27.090 | 3.20 | 1.48749 | 70.2 |
| 3 | −217.337 | 0.20 | | |
| 4 | 23.552 | 2.30 | 1.69680 | 55.5 |
| 5 | 70.228 | (variable) | | |
| 6* | 65.879 | 1.00 | 1.84862 | 40.0 |
| 7* | 4.810 | 3.13 | | |
| 8 | −11.695 | 0.60 | 1.80400 | 46.6 |
| 9 | −79.580 | 0.20 | | |

-continued

| Surface Data | | | | |
|---|---|---|---|---|
| Surface Number | r | d | nd | vd |
| 10 | 17.486 | 1.35 | 1.94595 | 18.0 |
| 11 | −157.677 | (variable) | | |
| 12(stop) | ∞ | −0.20 | | |
| 13* | 10.042 | 1.65 | 1.76753 | 49.3 |
| 14 | −37.510 | 2.50 | | |
| 15 | 31.005 | 0.60 | 1.92286 | 18.9 |
| 16 | 9.117 | 0.52 | | |
| 17 | −34.472 | 1.20 | 1.48749 | 70.2 |
| 18 | −8.198 | −0.10 | | |
| 19 | ∞ | (variable) | | |
| 20 | 12.715 | 2.65 | 1.48749 | 70.2 |
| 21 | −17.995 | 0.60 | 1.83400 | 37.2 |
| 22 | −46.607 | (variable) | | |
| 23 | ∞ | 0.70 | 1.51633 | 64.1 |
| 24 | ∞ | 1.09 | | |
| image plane | ∞ | | | |

Aspherical Surface Data
6th Surface
  K=0.00000e+000  A 8=−5.39028e-008  A10=8.28382e-010
7th Surface
  K=−1.93021e+000 A 4=1.79188e-003 A 6=8.34873e-007
  A 8=7.24157e-008
13th Surface
  K=−3.77479e+000 A 4=1.58413e-004 A 6=4.53171e-007
  A 8=−2.49737e-007

| Other Data Zoom Ratio 11.42 | | | | |
|---|---|---|---|---|
| | Wide Angle | Intermediate 1 | Intermediate 2 | Telephoto |
| Focal Length | 5.13 | 8.46 | 21.73 | 58.52 |
| F-number | 3.60 | 4.24 | 5.10 | 5.78 |
| Field Angle | 35.68 | 24.60 | 10.11 | 3.79 |
| Image Height | 3.68 | 3.88 | 3.88 | 3.88 |
| Overall Lens Length | 51.30 | 50.64 | 63.30 | 71.65 |
| BF | 6.91 | 9.67 | 12.75 | 6.32 |
| d 5 | 0.80 | 3.01 | 14.28 | 23.12 |
| d11 | 15.63 | 8.56 | 3.33 | 0.60 |
| d19 | 5.42 | 6.85 | 10.40 | 19.06 |
| d22 | 5.36 | 8.12 | 11.20 | 4.77 |

| Zoom Lens Unit Data | | |
|---|---|---|
| Unit No. | Front Surface | Focal Length |
| 1 | 1 | 38.00 |
| 2 | 6 | −6.65 |
| 3 | 12 | 13.11 |
| 4 | 20 | 27.06 |

Third Numerical Example

Surface Data

| Surface Number | r | d | nd | vd |
|---|---|---|---|---|
| 1 | 38.793 | 0.85 | 1.92286 | 18.9 |
| 2 | 25.237 | 2.80 | 1.69680 | 55.5 |
| 3 | 189.882 | 0.20 | | |
| 4 | 24.986 | 1.90 | 1.77250 | 49.6 |
| 5 | 58.352 | (variable) | | |
| 6* | −61426.222 | 0.85 | 1.84862 | 40.0 |
| 7* | 4.620 | 2.91 | | |
| 8 | −19.907 | 0.55 | 1.71300 | 53.9 |
| 9 | 25.510 | 0.20 | | |
| 10 | 12.054 | 1.15 | 1.94595 | 18.0 |
| 11 | 108.693 | (variable) | | |
| 12(stop) | ∞ | −0.20 | | |
| 13* | 8.253 | 1.20 | 1.76753 | 49.3 |
| 14 | −34.623 | 2.10 | | |
| 15 | 24.644 | 0.50 | 1.94595 | 18.0 |
| 16 | 7.483 | 0.58 | | |
| 17 | −87.667 | 0.95 | 1.49700 | 81.5 |
| 18 | −8.052 | −0.10 | | |
| 19 | ∞ | (variable) | | |
| 20 | 11.250 | 1.75 | 1.48749 | 70.2 |
| 21 | −168.108 | (variable) | | |
| 22 | ∞ | 0.80 | 1.51633 | 64.1 |
| 23 | ∞ | 0.50 | | |
| image plane | ∞ | | | |

Aspherical Surface Data
6th Surface
 K=0.00000e+000 A 8=9.71865e-009 A10=−1.78827e-010
7th Surface
 K=−2.00370e+000 A 4=2.06660e-003 A 6=−1.13015e-005
 A 8=8.35449e-007
13th Surface
 K=−6.73213e+000 A 4=1.05442e-003 A 6=−5.40410e-005
 A 8=2.74200e-006

Other Data
Zoom Ratio 9.86

| | Wide Angle | Intermediate 1 | Intermediate 2 | Intermediate 3 | Telephoto |
|---|---|---|---|---|---|
| Focal Length | 4.30 | 6.15 | 8.40 | 20.13 | 42.40 |
| F-number | 3.60 | 4.07 | 4.50 | 4.81 | 5.15 |
| Field Angle | 39.02 | 32.20 | 24.77 | 10.90 | 5.22 |
| Image Height | 3.48 | 3.88 | 3.88 | 3.88 | 3.88 |
| Overall Lens Length | 44.00 | 41.54 | 44.38 | 54.02 | 58.79 |
| BF | 5.63 | 7.17 | 7.86 | 9.90 | 6.58 |
| d 5 | 0.80 | 1.00 | 3.45 | 14.45 | 20.42 |
| d11 | 14.16 | 8.71 | 6.42 | 2.66 | 0.68 |
| d19 | 5.21 | 6.46 | 8.45 | 8.82 | 12.90 |
| d21 | 4.60 | 6.14 | 6.84 | 8.87 | 5.56 |

Zoom Lens Unit Data

| Unit No. | Front Surface | Focal Length |
|---|---|---|
| 1 | 1 | 34.50 |
| 2 | 6 | −5.95 |
| 3 | 12 | 11.11 |
| 4 | 20 | 21.70 |

Fourth Numerical Example

Surface Data

| Surface Number | r | d | nd | vd |
|---|---|---|---|---|
| 1 | 38.471 | 0.85 | 1.92286 | 18.9 |
| 2 | 24.964 | 2.70 | 1.69680 | 55.5 |
| 3 | 163.910 | 0.15 | | |
| 4 | 24.170 | 1.90 | 1.77250 | 49.6 |
| 5 | 53.557 | (variable) | | |
| 6* | −646.504 | 0.80 | 1.84862 | 40.0 |
| 7* | 4.458 | 2.90 | | |
| 8 | −35.999 | 0.50 | 1.88300 | 40.8 |
| 9 | 17.990 | 0.18 | | |
| 10 | 10.616 | 1.30 | 1.94595 | 18.0 |
| 11 | 110.906 | (variable) | | |
| 12(stop) | ∞ | −0.20 | | |
| 13* | 7.706 | 1.20 | 1.76753 | 49.3 |
| 14 | −31.715 | 1.85 | | |
| 15 | 17.874 | 0.50 | 1.94595 | 18.0 |
| 16 | 6.536 | 0.66 | | |
| 17 | −32.501 | 0.90 | 1.49700 | 81.5 |
| 18 | −7.036 | −0.10 | | |
| 19 | ∞ | (variable) | | |
| 20* | 16.818 | 1.40 | 1.55000 | 71.2 |
| 21 | −60.312 | (variable) | | |
| 22 | ∞ | 0.80 | 1.51633 | 64.1 |
| 23 | ∞ | 0.50 | | |
| image plane | ∞ | | | |

Aspherical Surface Data
6th Surface
 K=0.00000e+000 A 8=2.46822e-009 A10=−1.14897e-011
7th Surface
 K=−2.32957e+000 A 4=2.70445e-003 A 6=−3.21252e-005
 A 8=1.26503e-006
13th Surface
 K=−3.02657e+000 A 4=2.47255e-004 A 6=4.06654e-006
 A 8=−1.78084e-006
20th Surface
 K=3.84639e+000 A 4=−4.80594e-005

Other Data
Zoom Ratio 12.65

| | Wide Angle | Intermediate 1 | Intermediate 2 | Intermediate 3 | Telephoto |
|---|---|---|---|---|---|
| Focal Length | 3.88 | 5.97 | 7.39 | 22.60 | 49.10 |
| F-number | 3.60 | 4.22 | 4.53 | 4.96 | 5.54 |
| Field Angle | 40.66 | 32.97 | 27.68 | 9.73 | 4.51 |
| Image Height | 3.33 | 3.88 | 3.88 | 3.88 | 3.88 |
| Overall Lens Length | 43.77 | 40.89 | 42.49 | 54.60 | 59.21 |
| BF | 5.03 | 6.36 | 6.80 | 10.07 | 4.93 |
| d 5 | 0.65 | 0.76 | 2.28 | 16.03 | 21.64 |

-continued

Other Data
Zoom Ratio 12.65

|     | Wide Angle | Intermediate 1 | Intermediate 2 | Intermediate 3 | Telephoto |
|-----|------------|----------------|----------------|----------------|-----------|
| d11 | 15.18      | 8.86           | 7.20           | 2.26           | 0.50      |
| d19 | 5.42       | 7.42           | 8.72           | 8.76           | 14.65     |
| d21 | 4.00       | 5.33           | 5.78           | 9.04           | 3.90      |

Zoom Lens Unit Data

| Unit No. | Front Surface | Focal Length |
|----------|---------------|--------------|
| 1        | 1             | 35.12        |
| 2        | 6             | −5.70        |
| 3        | 12            | 10.47        |
| 4        | 20            | 24.07        |

Fifth Numerical Example

Surface Data

| Surface Number | r         | d          | nd      | vd   |
|----------------|-----------|------------|---------|------|
| 1              | 36.720    | 0.80       | 1.84666 | 23.9 |
| 2              | 22.378    | 2.80       | 1.48749 | 70.2 |
| 3              | −2413.968 | 0.15       |         |      |
| 4              | 22.140    | 2.05       | 1.69680 | 55.5 |
| 5              | 83.533    | (variable) |         |      |
| 6*             | 68.050    | 0.80       | 1.84862 | 40.0 |
| 7*             | 5.364     | 2.93       |         |      |
| 8              | −18.471   | 0.50       | 1.88300 | 40.8 |
| 9              | 22.226    | 0.18       |         |      |
| 10             | 12.601    | 1.30       | 1.92286 | 18.9 |
| 11             | −109.743  | (variable) |         |      |
| 12(stop)       | ∞         | 0.43       |         |      |
| 13*            | 5.008     | 1.50       | 1.58313 | 59.4 |
| 14*            | −28.428   | 0.40       |         |      |
| 15             | 7.352     | 1.10       | 1.48749 | 70.2 |
| 16             | 6.298     | 0.50       | 1.94595 | 18.0 |
| 17             | 3.760     | 0.35       |         |      |
| 18             | ∞         | (variable) |         |      |
| 19             | 11.018    | 1.75       | 1.49700 | 81.5 |
| 20             | −39.365   | (variable) |         |      |
| 21             | ∞         | 0.70       | 1.51633 | 64.1 |
| 22             | ∞         | 1.13       |         |      |
| image plane    | ∞         |            |         |      |

Aspherical Surface Data

6th Surface

K=0.00000e+000 A 8=3.64792e-008 A10=−7.41911e-010

7th Surface

K=−2.03829e+000 A 4=1.59317e-003 A 6=−9.70842e-006

A 8=1.22842e-006

13th Surface

K=−3.50406e+000 A 4=2.75758e-003 A 6=−9.13630e-005

A 8=7.38333e-006

14th Surface

K=−3.86721e+001 A 4=1.39448e-004 A 6=4.77069e-005

Other Data
Zoom Ratio 9.63

|                    | Wide Angle | Intermediate 1 | Intermediate 2 | Intermediate 3 | Telephoto |
|--------------------|------------|----------------|----------------|----------------|-----------|
| Focal Length       | 5.13       | 6.02           | 6.67           | 22.36          | 49.41     |
| F-number           | 3.60       | 3.84           | 4.17           | 4.78           | 4.89      |
| Field Angle        | 35.67      | 32.78          | 30.16          | 9.83           | 4.48      |
| Image Height       | 3.68       | 3.88           | 3.88           | 3.88           | 3.88      |
| Overall Lens Length| 44.68      | 43.22          | 43.18          | 52.37          | 55.88     |
| BF                 | 7.04       | 7.79           | 7.92           | 10.95          | 6.25      |
| d 5                | 0.65       | 0.80           | 0.19           | 13.92          | 19.81     |
| d11                | 15.21      | 12.49          | 11.17          | 3.60           | 0.58      |
| d18                | 4.24       | 4.60           | 6.36           | 6.36           | 11.71     |
| d20                | 5.44       | 6.20           | 6.33           | 9.36           | 4.66      |

Zoom Lens Unit Data

| Unit No. | Front Surface | Focal Length |
|----------|---------------|--------------|
| 1        | 1             | 32.99        |
| 2        | 6             | −6.85        |
| 3        | 12            | 12.29        |
| 4        | 19            | 17.52        |

TABLE 1

|     | 1st Numerical Example | 2nd Numerical Example | 3rd Numerical Example | 4th Numerical Example | 5th Numerical Example |
|-----|-----------------------|-----------------------|-----------------------|-----------------------|-----------------------|
| (1) | 0.757                 | 0.649                 | 0.814                 | 0.654                 | 0.668                 |
| (2) | −1.30                 | −1.30                 | −1.38                 | −1.47                 | −1.34                 |
| (3) | 0.355                 | 0.152                 | 0.559                 | 0.608                 | 1.193                 |
| (4) | 0.027                 | 0.209                 | 0.066                 | 0.015                 | 0.083                 |
| (5) | 9.81                  | 11.06                 | 10.53                 | 12.58                 | 8.90                  |
| (6) | 0.757                 | 0.757                 | 0.822                 | 0.759                 | 0.772                 |
| (7) | 0.385                 | 0.387                 | 0.394                 | 0.362                 | —                     |

In each embodiment, due to the above-described structure, the size can be reduced and the zoom ratio can be increased. Thus, a high performance zoom lens is provided which can be used in a high pixel digital camera, video camera, etc., and which is capable of correcting aberrations, such as the spherical aberration, the coma aberration, the field curvature, the axial chromatic aberration, and the chromatic aberration of magnification, over the entire zoom range.

Next, a digital still camera including a zoom lens according to at least one embodiment of the present invention as an imaging optical system will be described with reference to FIG. 11.

Referring to FIG. 11, a camera body 20 includes an imaging optical system 21 including the zoom lens according to at least one of the first to fifth embodiments.

A solid-state image pickup element (photoelectric conversion element) 22, such as a CCD sensor and a CMOS sensor, for receiving an object image formed by the imaging optical system 21 is disposed in the camera body 20. A memory 23 records information corresponding to the object image that is subjected to photoelectric conversion performed by the solid-state image pickup element 22.

A finder 24 is formed of, for example, a liquid crystal display panel or the like and allows a user to observe the object image formed on the image-pickup element 22.

Next, a video camera (optical apparatus) including a zoom lens according to at least one embodiment of the present invention as an imaging optical system will be described with reference to FIG. 12.

Referring to FIG. 12, a video camera body 10 includes an imaging optical system 11 including the zoom lens according to at least one of the first to fifth embodiments.

A solid-state image pickup element (photoelectric conversion element) 12, such as a CCD sensor and a CMOS sensor, for receiving an object image formed by the imaging optical system 11 is disposed in the camera body 20. A recording unit 13 records information corresponding to the object image that is subjected to photoelectric conversion performed by the solid-state image pickup element 12. A finder 14 is used for observing an object image displayed on a display device (not shown).

The display device includes a liquid crystal panel or the like and displays the object image formed on the image pickup device 12.

When the zoom lens according to at least one embodiment of the present invention is included in an image pickup apparatus, such as a digital still camera and a video camera, a small image pickup apparatus which provides high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-308437 filed Dec. 3, 2008, which is hereby incorporated by reference herein in its entirety.

What is claimed is:

1. A zoom lens, comprising:
a first lens unit having a positive refractive power;
a second lens unit having a negative refractive power;
a third lens unit having a positive refractive power; and
a fourth lens unit having a positive refractive power,
wherein the first, second, third, and fourth lens units are arranged in order from an object side to an image side, respectively,
wherein, during zooming from a wide-angle end to a telephoto end, the first lens unit moves along a locus that is convex toward the image side, the second lens unit moves along a locus that is convex toward the image side in a zoom range from the wide-angle end to an intermediate zoom position and along a locus that is convex toward the object side in a zoom range from the intermediate zoom position to the telephoto end, and the third lens unit moves such that the distance between the third lens unit and the second lens unit at the telephoto end is smaller than that at the wide-angle end, and
wherein, when f1 is a focal length of the first lens unit and ft is a focal length of the entire lens system of the zoom lens at the telephoto end, a following condition is satisfied:

$0.3 < f1/ft < 1.1$

2. The zoom lens according to claim 1, wherein, when f2 is a focal length of the second lens unit and fw is a focal length of the entire system of the zoom lens at the wide-angle end, a following condition is satisfied:

$-1.8 < f2/fw < -1.0$.

3. The zoom lens according to claim 1, wherein, when m2 and m3 are displacements of the second lens unit and the third lens unit, respectively, along an optical axis between the wide-angle end and the telephoto end, a following condition is satisfied:

$0 \leq |m2/m3| < 1.7$.

4. The zoom lens according to claim 1, wherein, when $\Delta m2$ is a distance between positions of the second lens unit on an optical axis and f2 is a local length of the second lens unit, the positions corresponding to a vertex of the locus that is convex toward the image side and a vertex of the locus that is convex toward the object side in a locus along which the second lens unit moves during zooming from the wide-angle end to the telephoto end, a following condition is satisfied:

$0.01 < |\Delta m2/f2| < 0.50$.

5. The zoom lens according to claim 1, wherein the second lens unit includes a plurality of negative lenses and one or more positive lenses in order from the object side to the image side.

6. The zoom lens according to claim 1, wherein the third lens unit is composed of one or more positive lens components and one or more negative lens components.

7. The zoom lens according to claim 1, wherein the third lens unit includes a positive lens having an aspherical surface.

8. The zoom lens according to claim 1, wherein, when β2w and β2t are lateral magnifications of the second lens unit at the wide-angle end and the telephoto end, respectively, and β3w and β3t are lateral magnifications of the third lens unit at the wide-angle end and the telephoto end, respectively, a following condition is satisfied:

$7.0 < (\beta 2t \cdot \beta 3t)/(\beta 2w \cdot \beta 3w) < 15.0$.

9. The zoom lens according to claim 1, wherein, when f3 is a focal length of the third lens unit and fw is a focal length of the entire system of the zoom lens at the wide-angle end, a following condition is satisfied:

$0.5 < f3/(fw \cdot ft)^{1/2} < 1.1$.

10. The imaging lens according to claim 1, wherein the second lens unit includes a negative lens having an aspherical surface.

11. The zoom lens according to claim 1, wherein the third lens unit include a positive lens, a negative lens, and a positive lens in order from the object side to the image side, and when d3a is an air gap between the positive lens arranged at the object side in the third lens unit and the negative lens in the third lens unit, d3 is a length between a first lens surface and a last lens surface in the third lens unit, a following condition is satisfied:

$0.25 < d3a/d3 < 0.5$.

12. The zoom lens according to claim 1, wherein the zoom lens forms an image on a solid-state image pickup element.

13. An image pickup apparatus, comprising:
the zoom lens according to claim 1; and
a solid-state image pickup element which receives an image formed by the zoom lens.

* * * * *